US011693684B2

(12) United States Patent
Shibayama et al.

(10) Patent No.: US 11,693,684 B2
(45) Date of Patent: *Jul. 4, 2023

(54) INFORMATION PROCESSING SYSTEM AND INFORMATION PROCESSING METHOD

(71) Applicant: HITACHI, LTD., Tokyo (JP)

(72) Inventors: Tsukasa Shibayama, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/356,026

(22) Filed: Jun. 23, 2021

(65) Prior Publication Data

US 2021/0326165 A1 Oct. 21, 2021

Related U.S. Application Data

(63) Continuation of application No. 17/014,454, filed on Sep. 8, 2020, now Pat. No. 11,048,546.

(30) Foreign Application Priority Data

Feb. 26, 2020 (JP) .................................. 2020-030875

(51) Int. Cl.
*G06F 9/455* (2018.01)
(52) U.S. Cl.
CPC ............... *G06F 9/45558* (2013.01); *G06F 2009/45583* (2013.01); *G06F 2009/45591* (2013.01)
(58) Field of Classification Search
CPC ....... G06F 9/45558; G06F 2009/45583; G06F 2009/45591

(Continued)

(56) References Cited

U.S. PATENT DOCUMENTS 7,802,251 B2 9/2010 Manabu
9,389,887 B1 7/2016 Aron
(Continued)

FOREIGN PATENT DOCUMENTS

JP 2014-075027 A 4/2014
JP 2019-120987 A 7/2019

OTHER PUBLICATIONS

Japanese Office Action dated Feb. 22, 2022 for Japanese Patent Application No. 2020-030875.

*Primary Examiner* — Bradley A Teets
(74) *Attorney, Agent, or Firm* — Volpe Koenig

(57) ABSTRACT

There are provided an information processing system that operates virtual machines and storage controllers on a processor, and an information processing method executed by the information processing system. A storage controller group capable of taking over processing between the storage controllers arranged in different nodes is provided. The virtual machine is movable between the different nodes by deploy. The virtual machine and the storage controller that processes data input and output by the virtual machine are arranged in the same node. A combination of the virtual machines that cannot be arranged in the same node is defined by a restriction. A management unit arranges one of the virtual machines that cannot be arranged in the same node in the node in which the storage controller included in the storage controller group to which the storage controller used by the other virtual machine belongs is not arranged.

8 Claims, 18 Drawing Sheets

(58) Field of Classification Search
USPC ............................................................ 718/1
See application file for complete search history.

(56) References Cited

U.S. PATENT DOCUMENTS

| | | |
|---|---|---|
| 10,628,273 B2 | 4/2020 | Yoshimura et al. |
| 11,048,546 B1* | 6/2021 | Shibayama ............ G06F 3/0635 |
| 2019/0205151 A1 | 7/2019 | Suzuki |
| 2020/0026576 A1 | 1/2020 | Kaplan |
| 2020/0104153 A1 | 4/2020 | Shibayama et al. |
| 2020/0319972 A1 | 10/2020 | Tang et al. |

* cited by examiner

| POOL ID | NAME | TOTAL CAPACITY | TOTAL FREE CAPACITY | NODE ID | CAPACITY | FREE CAPACITY |
|---|---|---|---|---|---|---|
| 1 | Pool 1 | 3000 | 1000 | 1 | 1000 | 500 |
| | | | | 2 | 2000 | 500 |
| 2 | Pool 2 | 2000 | 300 | 3 | 2000 | 300 |
| ... | ... | ... | ... | ... | ... | ... |
| 34AA | 34AB | 34AC | 34AD | 34AE | 34AF | 34AG |

| VOL_ID | NAME | CAPACITY | POOL ID | SCG_ID | ... |
|---|---|---|---|---|---|
| 1 | Volume1 | 100 | 1 | 1 | ... |
| 2 | | | 1 | 1 | ... |
| 3 | | | 2 | 1 | ... |
| 4 | | | 2 | 2 | ... |
| ... | ... | ... | ... | ... | ... |
| 34BA | 34BB | 34BC | 34BD | 34BE | |

| NODE ID | NAME | PHYSICAL CAPACITY | ... |
|---|---|---|---|
| 1 | node1 | 1000 | ... |
| 2 | node2 | 2100 | ... |
| ... | ... | ... | ... |
| 34CA | 34CB | 34CC | |

| VIRTUAL MACHINE ID | DATA STORE ID | ROLE | VOLUME ID | AFFINITY RULE ID |
|---|---|---|---|---|
| 1 | 1 | STORAGE CONTROL AND DATA REDUNDANCY AND MANAGEMENT | 1 | - |
| 2 | 2 | VIRTUAL MACHINE MANAGEMENT | 2 | - |
| 3 | 2 | USER APPLICATION OS | 2 | 1 |
| 4 | 3 | USER APPLICATION OS | 3 | 1 |
| 5 | 4 | USER APPLICATION OS | 4 | 1 |
| 6 | 5 | STORAGE CONTROL AND DATA REDUNDANCY AND MANAGEMENT | 5 | - |
| 7 | 6 | VIRTUAL MACHINE MANAGEMENT | 6 | - |
| 8 | 7 | USER APPLICATION OS | 7 | 2 |
| 9 | 8 | USER APPLICATION OS | 8 | 3 |
| 10 | 8 | USER APPLICATION OS | 9 | 3 |
| ... | ... | ... | ... | ... |

| AFFINITY RULE ID | RULE CLASSIFICATION | NODE IDS | VIRTUAL MACHINE IDS | CONDITION SATISFACTION/ DISSATISFACTION | FAULT TOLERANCE LEVEL |
|---|---|---|---|---|---|
| 1 | VM-NODE AFFINITY | 1 | 1,2 | DISSATISFACTION | - |
| 2 | VM-NODE AFFINITY | 2,3 | 3,4 | SATISFACTION | - |
| 3 | VM-VM ANTI-AFFINITY | - | 5,6,7 | SATISFACTION | MEDIUM |
| 4 | VM-VM ANTI-AFFINITY | - | 8,9 | SATISFACTION | HIGH |
| ... | ... | ... | ... | ... | ... |

| STORAGE CONTROLLER ID | STATE | SCG ID | NODE ID | VIRTUAL MACHINE ID |
|---|---|---|---|---|
| 1 | Active | 1 | 1 | 1 |
| 2 | Standby | 1 | 2 | 2 |
| 3 | Active | 2 | 2 | 3 |
| 4 | Standby | 2 | 3 | 4 |
| 5 | Active | 3 | 3 | 5 |
| 6 | Dead | 3 | 4 | 6 |
| 7 | Dead | 4 | 4 | 7 |
| 8 | Active | 4 | 1 | 8 |
| ... | ... | ... | ... | ... |
| 37A | 37B | 37C | 37D | 37E |

| AFFINITY RULE ID | NODE ID | ADDITIONAL DRIVE CAPACITY |
|---|---|---|
| 1 | 1 | 10TB |
|   | 10 | 100TB |
| 2 | 1 |   |
| 3 | 2 |   |
| ... | ... | ... |

43A　　43B　　43C

INFORMATION PROCESSING SYSTEM AND INFORMATION PROCESSING METHOD

CROSS REFERENCE TO RELATED APPLICATION

This application is a Continuation Application of U.S. patent application Ser. No. 17/014,454 filed Sep. 8, 2020 which claims benefit of Japanese Patent Application No. 2020-030875 filed Feb. 26, 2020, which are incorporated herein by reference.

BACKGROUND OF THE INVENTION

1. Field of the Invention

The present invention relates to information processing system and method, and is suitable by being applied to an information processing system that has a plurality of nodes constituting a cluster and has certain restrictions on arrangement of virtual machines (VMs) deployed in each node.

2. Description of the Related Art

In recent years, a virtualization technology for operating a plurality of virtual machines on one physical server has become widespread, and many inventions regarding redundancy of the virtual machines have been proposed. For example, JP 2014-75027 A discloses a technology of arranging a plurality of virtual machines as active systems and virtual machines as reserve systems provided so as to correspond to these virtual machines as the active systems in the plurality of physical servers.

SUMMARY OF THE INVENTION

Incidentally, in an information processing system including a plurality of physical servers constituting a cluster, when resources such as virtual machines and volumes are deployed in the physical servers, there may be certain restrictions called affinity rules.

Examples of such an affinity rule include an affinity rule that limits the physical servers that operate the virtual machines in order to reduce a licensing problem or the amount of communication between the physical servers and an anti-affinity rule that limits arrangement destinations of the virtual machines as active system and the reserve system to different physical servers in order to achieve high availability.

In this case, there are concerns that fault occurs in the virtual machine or the physical server in which the virtual machine operates when the arrangement destination of each virtual machine is determined in consideration of only a normal time and fault occurs om the affinity rule (particularly, the anti-affinity rule) when the virtual machine as the reserve system takes over processing from the virtual machine as the active system by a failover.

The present invention has been made in consideration of the above points, and an object of the present invention is to propose information processing system and method with high reliability and high availability capable of complying with a restriction designated for each virtual machine even though a failover caused by fault occurrence occurs.

In order to solve such problems, an aspect of the present invention provides an information processing system including a plurality of nodes that has a processor, and a storage device that stores data. The information processing system operates virtual machines and storage controllers on the processor, a storage controller group capable of taking over processing between the storage controllers arranged in different nodes is provided, the virtual machine is movable between the different nodes by deploy, the virtual machine and the storage controller that processes data input and output by the virtual machine are arranged in the same node, a combination of the virtual machines that cannot be arranged in the same node is defined by a restriction, and a management unit arranges one of the virtual machines that cannot be arranged in the same node in the node in which the storage controller included in the storage controller group to which the storage controller used by the other virtual machine belongs is not arranged.

Another aspect of the present invention provides an aspect of the present invention provides an information processing method executed by an information processing system that includes a plurality of nodes having a processor, and a storage device storing data, and operates virtual machines and storage controllers on the processor. The method includes providing a storage controller group capable of taking over processing between the storage controllers arranged in different nodes, setting the virtual machine to be movable between the different nodes by deploy, arranging the virtual machine and the storage controller that processes data input and output by the virtual machine in the same node, defining a combination of the virtual machines that cannot be arranged in the same node by a restriction, and arranging one of the virtual machines that cannot be arranged in the same node in the node in which the storage controller included in the storage controller group to which the storage controller used by the other virtual machine belongs is not arranged.

According to the information processing system and method of the present invention, it is possible to comply with the restriction designated for each virtual machine even though a failover caused by fault occurrence occurs.

According to the present invention, it is possible to realize information processing system and method with high reliability and high availability.

BRIEF DESCRIPTION OF THE DRAWINGS

FIG. 5A is a chart illustrating a configuration example of a pool configuration management table;

FIG. 5B is a chart illustrating a configuration example of a volume configuration management table;

FIG. 5C is a chart illustrating a configuration example of a node configuration management table;

FIG. 6 is a table illustrating a configuration example of a virtual machine management table;

FIG. 7 is a chart illustrating a configuration example of an affinity rule management table;

FIG. 8 is a chart illustrating a configuration example of a storage controller management table;

DESCRIPTION OF THE PREFERRED EMBODIMENTS

Hereinafter, embodiments of the present invention will be described with reference to the drawings.

Figure 1:
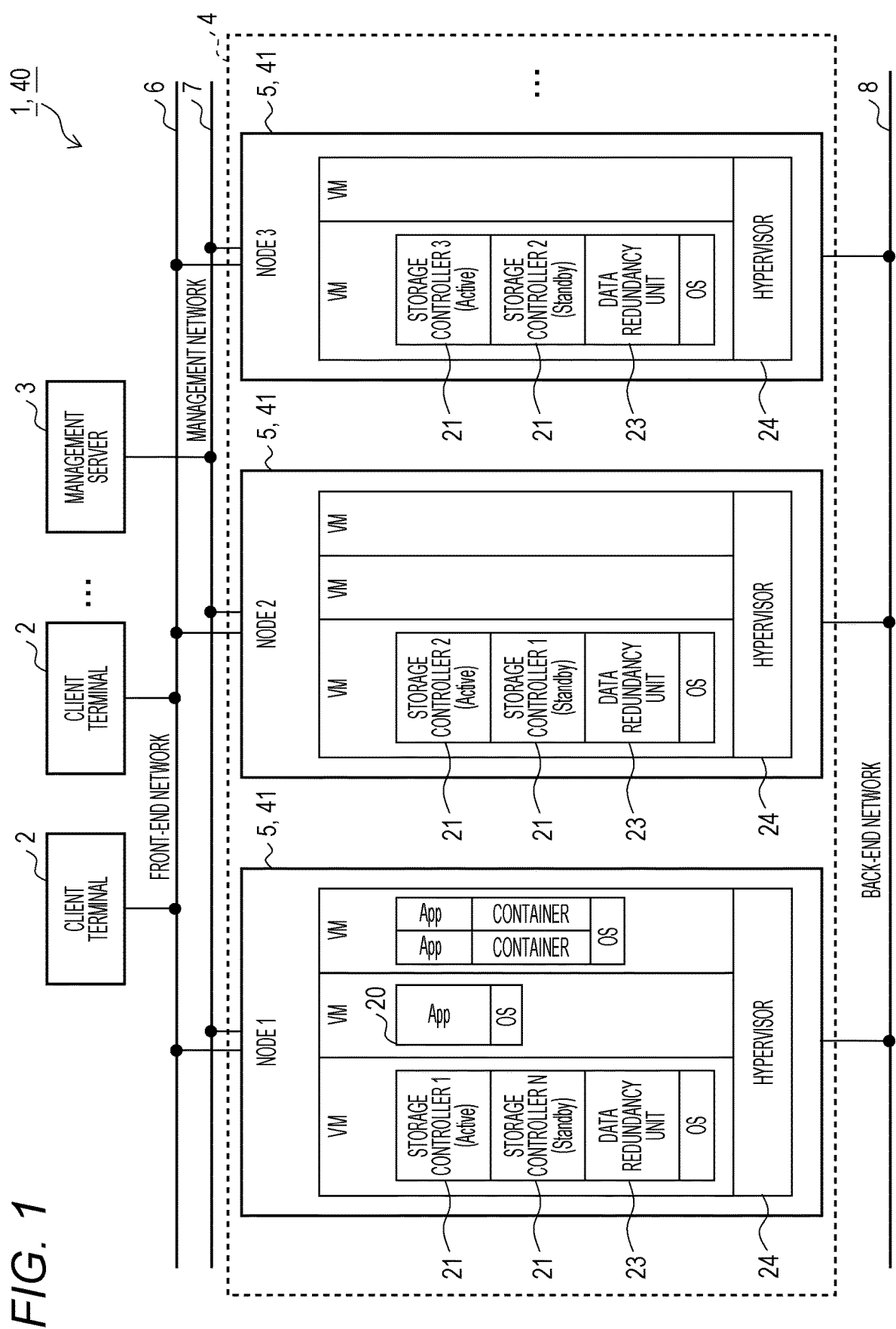
FIG. 1 is a block diagram illustrating overall configurations of information processing systems according to first and second embodiments.

(1) First Embodiment (1-1) Configuration of Information Processing System According to Present Embodiment In FIG. 1, a reference numeral 1 indicates an information processing system according to the present embodiment as a whole. The information processing system 1 includes one or a plurality of client terminals 2, a management server 3, and a plurality of nodes 5 constituting a cluster 4. Although FIG. 1 illustrates a case where only one cluster 4 is set in the information processing system 1, a plurality of clusters 4 may be provided in the information processing system 1.

The client terminal 2 is connected to each node 5 via a front-end network 6. The front-end network 6 is a network for exchanging commands and data between the client terminal 2 and the nodes 5, and is, for example, Fiber Channel, Ethernet (registered trademark), InfiniBand, a wired local area network (LAN), or a wireless LAN.

The nodes are connected via a management network 7 and a back-end network 8. The management network 7 is a network for exchanging control information and commands between the management server 3 and the nodes 5, and between the nodes 5, and is, for example, a wired LAN or a wireless LAN. The back-end network 8 is a network for exchanging data between the nodes 5, and is Fiber Channel, Ethernet (registered trademark), InfiniBand, a wired LAN, or a wireless LAN similarly to the front-end network 6.

Although FIG. 1 illustrates an example in which the front-end network 6, the management network 7 and the back-end network 8 are separate networks, the front-end network 6, the management network 7, and the back-end network 8 may be one network.

The client terminal 2 is a general-purpose computer device that transmits necessary commands and data to the corresponding node 5 in response to a user operation or a request from an installed application. The client terminal 2 may be a virtual computer device such as a virtual machine.

The management server 3 is a node for a system administrator to perform necessary settings and maintenance for each node 5, and is a general-purpose computer device. However, the management server 3 may also be a virtual computer device such as a virtual machine.

Figure 2:
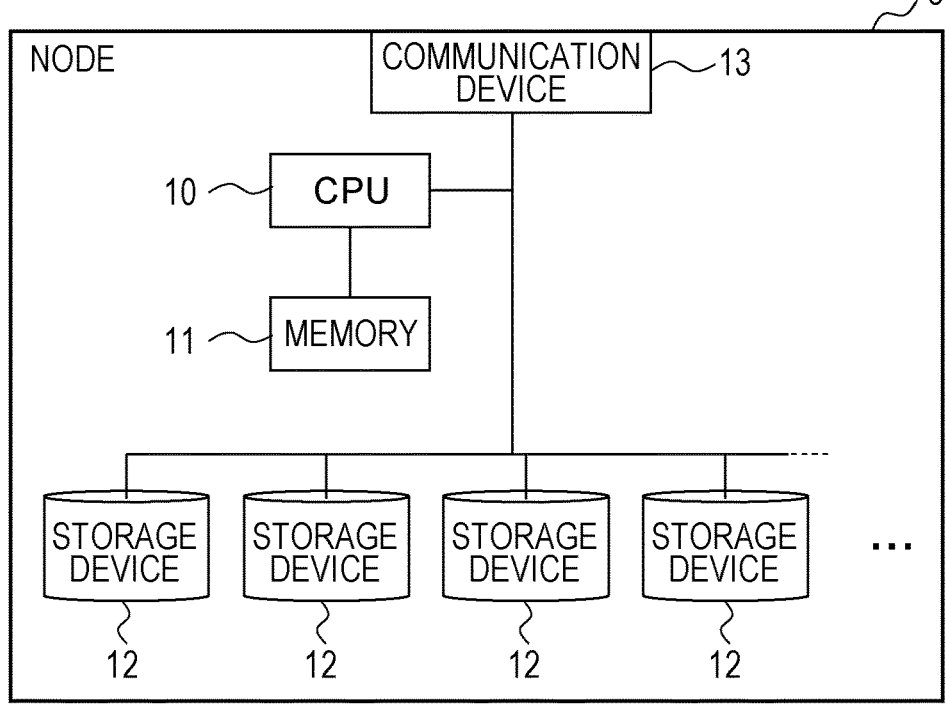
FIG. 2 is a block diagram illustrating a hardware configuration of a node.

As illustrated in FIG. 2, the node 5 is a general-purpose server device including at least one central processing unit (CPU) 10, at least one memory 11, a plurality of storage devices 12, and at least one communication device 13.

The CPU 10 is a processor that controls operations of the entire node 5. The memory 11 is a volatile semiconductor memory such as a static random access memory (static RAM or SRAM) and a dynamic RAM (DRAM) or a non-volatile semiconductor memory, and is used to temporarily retain programs and data required as a work memory of the CPU 10. The CPU 10 executes the programs retained in the memory 11, and thus, various kinds of processing of the entire node 5 to be described later are executed.

The storage device 12 is a large capacity non-volatile storage device such as a hard disk drive (HDD) device such as a Serial Attached Small Computer System Interface (SAS SCSI) disk, a Serial Advanced Technology Attachment (SATA ATA) disk, a solid state drive (SSD), and/or a storage class memory (SCM), and provides a storage region for reading and writing data.

the communication device 13 is an interface that enables the node 5 to communicate with the client terminal 2 or the management server 3 via the front-end network 6 or the management network 7 or to communicate with another node 5 via the management network 7 or the back-end network 8, and is, for example, a Fiber Channel card, an Ethernet (registered trademark) card, an InfiniBand card, a wired LAN card, or a wireless LAN card. The communication device 13 may be provided so as to correspond to each of the front-end network 6, the management network 7, and the back-end network 8.

(1-2) Logical Configuration of Node and Storage Region

Next, a logical configuration of the node 5 will be described. The node 5 of the present embodiment is a server device that provides, to the client terminal 2, a hyper-converged infrastructure (HCI) environment known as a virtualization platform having a simple configuration that integrates a computing function and a storage function.

In the HCI environment, as illustrated in FIG. 1, a virtual machine (hereinafter, appropriately referred to as an application virtual machine) VM that operates an application 20, and a virtual machine (hereinafter, appropriately referred to as a storage virtual machine) VM that operates a storage controller 21 and a container 22 are present on the same node 5, and shares computer resources such as the CPU 10 and the memory 11. The storage controller 21 operated by the storage virtual machine VM executes reading and writing (IO: Input and Output) of data from and to the storage region in the own node 5 or another node 5 in response to a request from the application 20 operated by the application virtual machine VM. FIG. 1 is an example in which each virtual machine VM operates on a hypervisor 24.

The storage controllers 21 are made redundant to improve availability. The storage controllers 21 constituting a redundant configuration are arranged in the nodes 5 different from each other, and are managed as a storage controller group. One of the storage controllers 21 constituting the storage controller group is set, as an active system, in an active state in which the reading and writing of data from and to the storage region in the node 5 are controlled in response to a request from the application virtual machine VM, and the other storage controllers 21 are set, as reserve systems, in a standby state.

When a fault occurs in the active storage controller (hereinafter, appropriately referred to as an active storage controller) 21 of the active system set to be in the active state or the node 5 in which the active storage controller 21 is arranged, a state of one of the active storage controllers (hereinafter, appropriately referred to as standby storage controllers) 21 of the reserve systems which belong to the same storage controller group as the active storage controller 21 and are set to be in the standby state until then is switched from the standby state to the active state.

Along with this, the application virtual machine VM is migrated to the node 5 in which the storage controller 21 switched to the active state at this time is arranged. Accordingly, the node 5 in which the storage controller (original standby storage controller) 21 promoted to a new active storage controller 21 is arranged takes over and executes processing executed in the node 5 in which the active storage controller 21 is arranged until then (failover function).

Meanwhile, the data read and written from and to the storage region by the application virtual machine VM via the active storage controller 21 is stores in the storage region in the node 5 in which the application virtual machine VM and the active storage controller 21 that controls the reading and writing of the data of the application virtual machine VM are arranged.

When the application virtual machine VM and the data read and written by the application virtual machine VM are present in the nodes 5 different from each other and the active storage controller 21 reads and writes the data in the storage region of the different node, communication is performed between the node 5 in which the application virtual machine VM is arranged and the node 5 having this storage region, and thus, response performance deteriorates. Accordingly, in order to prevent the response performance, the data read and written by the application virtual machine is stored in the node in which the active storage controller is arranged. Hereinafter, it is assumed that a case where the virtual machine VM and the data read and written by the virtual machine VM are present in the same node 5 is referred to as "locality".

The data read and written from and to the storage region by the application virtual machine VM is also made redundant by a data redundancy unit 23 operated by the storage virtual machine VM. However, for the same reason as above, the redundant data is stored in the storage region in the node 5 in which the standby storage controller 21 belonging to the same storage controller group as the active storage controller 21 is arranged such that the locality is maintained even after a failover. Accordingly, even when the failover occurs, the same IO performance as before the failover occurs can be maintained.

Figure 3:
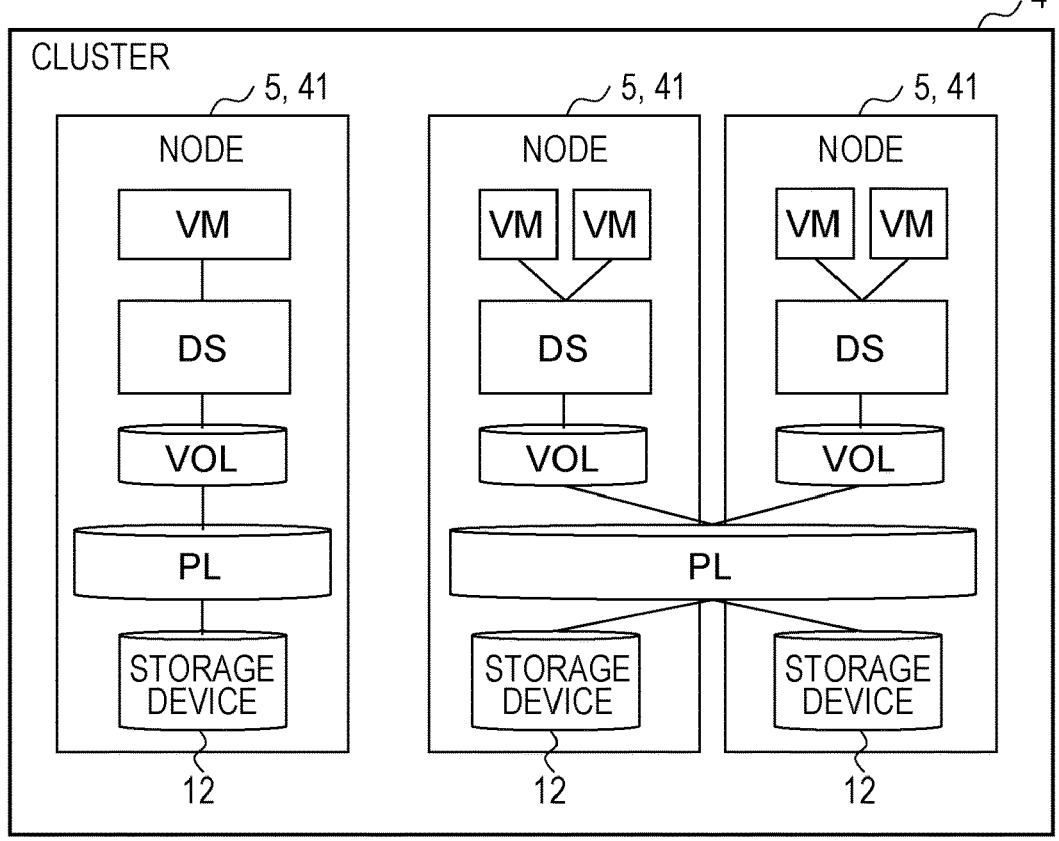
FIG. 3 is a block diagram illustrating a logical configuration of the node.

FIG. 3 illustrates a correspondence between the virtual machines VM in the cluster 4 and the storage regions. As illustrated in FIG. 3, in the cluster 4, the storage regions provided by one or the plurality of storage devices 12 in the same node 5 or the storage regions provided by the storage devices 12 in the plurality of nodes 5 are integrated into one, and are managed as a pool PL.

FIG. 3 illustrates a case where the pool PL in one node 5 and the pool PL across the plurality of nodes 5 are created, but a plurality of pools PL may be created. A pool P1 having a hierarchical structure may be created by combining the storage regions provided by the plurality of storage devices 12 having different response speeds in the same node 5 or the plurality of nodes 5.

On these pools PL, one or a plurality of volumes VOL is created in response to an instruction from the system administrator via the management server 3. These volumes VOL are allocated to the application virtual machines VM as the storage regions for reading and writing data. The reading and writing of the data from and to the volume VOL using the application virtual machine VM are performed via the active storage controller 21 associated with the application virtual machine VM.

Although it has been described in the example of FIG. 3 that the storage region of each volume VOL is allocated from the storage region of the corresponding pool PL (the volume VOL is cut out from the pool PL), the pool PL is not defined, and the storage region may be directly allocated to the volume VOL from one or the plurality of storage devices 12.

A data store DS is a volume for retaining the data of the virtual machine VM, and stores configuration information of the virtual machine VM and a file in which an OS is stored. The virtual machine VM is deployed from the data store DS. Accordingly, a case where "the arrangement of the virtual machine VM is determined" means that "a location of the data store DS that deploys the virtual machine VM is determined".

A relationship between the number of volume VOL, the number of data stores DS, and the number of virtual machines VM is not particularly determined. For example, a configuration ratio may be 1:1:1, or may be 1:1:N (N is a positive integer). The relationship between the volume VOL, the data store DS, and the virtual machine VM is managed by using a storage management program 32 to be described later with reference to FIG. 4 by using a node configuration management table group 34 to be described later with reference to FIGS. 5A to 5C.

(1-3) Virtual Machine Arrangement Determination Function (1-3-1) Program and Control Information Associated with Virtual Machine Arrangement Determination Function Next, a virtual machine arrangement determination function installed on the information processing system 1 will be described. The virtual machine arrangement determination function is a function of determining an arrangement destination of the virtual machine VM so as not to violate an affinity rule (particularly, anti-affinity rule) of the virtual machine VM while maintaining the locality indicating that the virtual machine VM and the data read and written from and to the volume VOL allocated to this virtual machine VM are present in the same node 5 when the virtual machine VM is newly created or the virtual machine VM is migrated to another node 5 even though the failover occurs due to the fault occurrence.

In describing the virtual machine arrangement determination function according to the present embodiment, first, various programs and various kinds of control information stored in the memory 11 (FIG. 2) of the node 5 in association with the virtual machine arrangement determination function will be described with reference to FIGS. 4 to 8.

Figure 4:
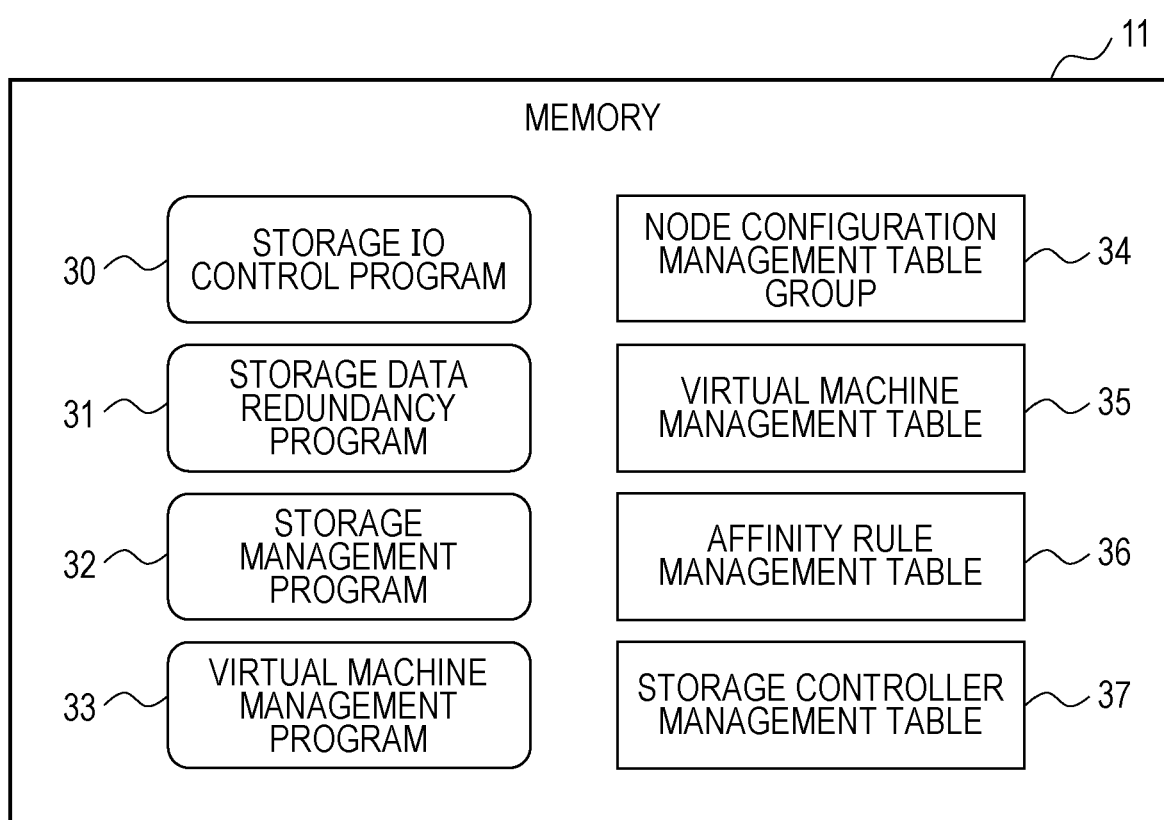
FIG. 4 is a block diagram for describing programs and control information stored in a memory of the node according to the first embodiment.

As illustrated in FIG. 4, in the memory 11 of each node 5, a storage IO control program 30, a storage data redundancy program 31, a storage management program 32, and a virtual machine management program 33 are stored as the programs, and a node configuration management table group 34, a virtual machine management table 45, an affinity rule management table 36, and a storage controller management table 37 are stored as the control information.

The storage IO control program 30 is a program having a function of controlling the reading and writing of the data from and to the volume VOL from the virtual machine VM. The storage virtual machine (specifically, the CPU 10 of the node 5) executes the storage IO control program 30, and thus, the storage controller 21 of FIG. 1 is implemented. The storage IO control program 30 (storage controller 21) also controls the input and output of the data between the storage controllers 21 and between the nodes 5.

The storage data redundancy program 31 is a program having a function of making the data written to the volume VOL redundant between the nodes 5. The storage virtual machine VM (specifically, the CPU 10 of the node 5) executes the storage data redundancy program 31, and thus, the data redundancy unit 23 of FIG. 1 is implemented. the storage data redundancy program 31 (data redundancy unit 23) in the corresponding node 5 performs communication, and thus, the data between the nodes 5 is made redundant by using a technique such as mirroring (duplication) or erasure coding.

The storage management program 32 is a program having a function of creating and providing the pool PL or the volume VOL based on an instruction given from the management server 3 in response to an operation of the system administrator or a request from the installed application or migrating the volume in the own node 5 to another node 5. The migration of the volume VOL is performed by creating a volume VOL of a migration destination of data in the node 5 of a migration destination and copying the data stored in the volume VOL of a migration source to the volume VOL of the migration destination.

The virtual machine management program 33 is a program having a function of creating the data store DS or the virtual machine VM based on an instruction given from the management server 3 in response to an operation of the system administrator or a request from the application installed on the management server 3 or migrating the virtual machine VM to another node 5. The migration of the virtual machine VM is performed by giving an instruction to the storage management program 32 and copying the data such that the data (including the data of the application and software executed by the virtual machine VM) of the virtual machine VM is copied to the node 5 of the migration destination by migrating the volume VOL and deploying the virtual machine VM in the node 5 of the migration destination by using the copied data.

Meanwhile, the node configuration management table group 34 is a table group for managing a storage configuration of each node 5 in the cluster 4, and includes a pool configuration management table 34A illustrated in FIG. 5A, a volume configuration management table 34B illustrated in FIG. 5B, and a node configuration management table 34C illustrated in FIG. 5C. The pool configuration management table 34A, the volume configuration management table 34B, and the node configuration management table 34C are created for each cluster 4.

The pool configuration management table 34A is a table used to manage the pool PL created in the corresponding cluster 4, and includes a pool ID field 34AA, a name field 34AB, a total capacity field 34AC, a total free capacity field 34AD, a node ID field 34AE, a capacity field 34AF, and a free capacity field 34AG as illustrated in FIG. 5A. In the pool configuration management table 34A, one row corresponds to one pool PL created in the corresponding cluster 4.

An identifier (pool ID) unique to the pool PL assigned to the corresponding pool PL is stored in the pool ID field 34AA, and a name assigned to the pool PL is stored in the name field 34AB. A value of a total capacity of the corresponding pool PL is stored in the total capacity field 34AC, and a value of a current total free capacity in the pool PL is stored in the total free capacity field 34AD.

An identifier (node ID) of the node 5 in which the corresponding pool PL is created is stored in the node ID field 34AE, a value of a capacity of the corresponding pool PL in the node 5 is stored in the capacity field 34AF, and a value of a free capacity of the pool PL in the node 5 is stored in the free capacity field 34AG.

When the corresponding pool PL is created across the plurality of nodes 5, the node ID field 34AE, the capacity field 34AF, and the free capacity field 34AG are distinguished in association with the nodes 5 that the pool PL is created across, and the node ID of that have been divided have the node ID of the corresponding node 5, the value of the total storage capacity allocated to the corresponding pool PL from the storage device 12 in the corresponding node 5, and the value of the free capacity of the total storage capacity are stored in the distinguished node ID field 34AE, capacity field 34AF, and free capacity field 34AG.

Accordingly, in the case of the example in FIG. 5A, a name of the pool PL to which the pool ID "1" is assigned is "Pool 1", a total capacity is "3000", and a total free capacity is "1000". This pool PL is created across the node 5 having the node ID "1" and the node 5 having the node ID "2". The capacity of the pool PL in the node 5 having the node ID "1" is "1000", the free capacity is "500", the capacity of the pool PL in the node 5 having the node ID "2" is "2000", and the free capacity is "500".

The volume configuration management table 34B is a table used to manage the volume VOL created in the corresponding cluster 4, and includes at least a volume ID field 34BA, a name field 34BB, a capacity field 34BC, a pool ID field 34BD, and a storage controller group ID field 34BE as illustrated in FIG. 5B. In the volume configuration management table 34B, one row corresponds to one volume VOL created in the corresponding cluster 4.

An identifier (volume ID) unique to the volume VOL assigned to the corresponding volume VOL is stored in the volume ID field 34BA, and a name assigned to the volume VOL is stored in the name field 34BB. A capacity of the corresponding volume VOL is stored in the capacity field 34BC, and a pool ID of the pool PL from which the volume VOL is cut out is stored in the pool ID field 34BD. An identifier (storage controller group ID) of the storage controller group to which the volume VOL is provided is stored in the storage controller group ID field 34BE.

Accordingly, in the example of FIG. 5B, a name of the volume VOL to which the volume ID "1" is assigned is "Volume 1", a capacity is "100", and a pool ID of the pool PL as a cutout source is "1". This volume is provided to the storage controller group to which the storage controller group ID "1" is assigned.

The node configuration management table 34C is a table used to manage the nodes 5 constituting the corresponding cluster 4, and includes at least a node ID field 34CA, a name field 34CB, and a physical capacity field 34CC as illustrated in FIG. 5C. In the node configuration management table 34C, one row corresponds to one node 5 constituting the corresponding cluster 4.

A node ID of the corresponding node 5 is stored in the node ID field 34CA, and a name of the node 5 is stored in the name field 34CB. A total physical capacity of each storage device 12 in the corresponding node 5 is stored in the physical capacity field 34CC. Accordingly, in the example of FIG. 5C, a name of the node 5 to which the node ID "1" is assigned is "node1", and a total physical capacity is "1000".

Meanwhile, the virtual machine management table 35 is a table used to manage the virtual machines VM in the corresponding cluster 4, and is created for each cluster 4. As illustrated in FIG. 6, the virtual machine management table 35 includes a virtual machine ID field 35A, a data store ID field 35B, a role field 35C, a volume ID field 35D, and an affinity rule ID field 35E. In the virtual machine management table 35, one row corresponds to one virtual machine VM in the corresponding cluster 4.

An identifier (virtual machine ID) unique to the virtual machine VM assigned to the corresponding virtual machine VM is stored in the virtual machine ID field 35A, and an identifier (data store ID) of the data store DS in which the file of the virtual machine VM is stored is stored in the data store ID field 35B.

A role of the corresponding virtual machine VM is stored in the role field 35C. The roles of the virtual machine VM include "storage control and data redundancy and management", "virtual machine (VM) management", and "user application OS". The virtual machine VM that plays the roles of "storage control and data redundancy and management" and "virtual machine (VM) management" corresponds to the storage virtual machine, and the virtual machine VM that plays the role of "user application OS" corresponds to the application virtual machine. The "Storage control and data redundancy and management" and "virtual machine (VM) management" may be integrated into one, and may be "for cluster management".

A volume ID of the volume VOL allocated to the virtual machine VM is stored in the volume ID field 35D. An identifier (affinity rule ID) of a preset affinity rule to be applied to the virtual machine VM is stored in the affinity rule ID field 35E.

Accordingly, in the case of the example of FIG. 6, for example, the virtual machines VM to which the virtual machine IDs "3" to "5" are respectively assigned are created (deployed) from the files stored in the data stores DS having the data store IDs "2" to "4", respectively. The role is "user application OS", and the volumes VOL having the volume IDs "2" to "4" are allocated, and the affinity rule having the affinity rule ID "1" is set to be applied in advance.

The affinity rule management table 36 is a table used to manage the affinity rules created in advance by the system administrator, and includes at least an affinity rule ID field 36A, a rule type field 36B, a node IDs field 36C, a virtual machine IDs field 36D, a condition satisfaction/dissatisfaction field 36E, and a fault tolerance level field 36F as illustrated in FIG. 7. In the affinity rule management table 36, one row corresponds to one affinity rule created by the system administrator.

An identifier (affinity rule ID) unique to the affinity rule assigned to the corresponding affinity rule is stored in the affinity rule ID field 36A, and a type (hereinafter, referred to as a rule type) of the affinity rule is stored in the rule type field 36B. In the case of the present embodiment, the rule type includes two types of "VM-node affinity rule" for designating the node 5 that can start the virtual machine VM or a range of the node 5 and "VM-VM affinity rule" for designating the virtual machine VM group that is prohibited from being started on the same node 5. However, affinity rules other than these two affinity rules can be applied.

When the rule type of the corresponding affinity rule is "VM-node affinity rule", the node IDs of all the nodes 5 that can start the virtual machines VM as targets are stored in the node IDs field 36C. However, a link to a separate table may be stored in the node IDs field 36D, and the node IDs of all the corresponding nodes 5 may be described in the separate table. The row may be changed for each corresponding node 5 such that only one node ID is stored in the node IDs field 36C.

When the rule type of the corresponding affinity rule is "VM-node affinity rule", the virtual machine IDs of all the target virtual machines VM are stored in the virtual machine IDs field 36D, and when the rule type of the corresponding affinity rule is "VM-VM anti-affinity rule", the virtual machine IDs of all the virtual machines VM that are prohibited from being started on the same node 5 are stored. However, a link to a separate table may be stored in the virtual machine IDs field 36D, and the virtual machine IDs of all the corresponding virtual machines VM may be described in the separate table. The row may be changed for each corresponding virtual machine VM such that only one virtual machine ID is stored in the virtual machine IDs field 36D.

Information indicating whether or not the arrangement of the corresponding virtual machines VM in the cluster 4 satisfies the corresponding affinity rule is stored in the condition satisfaction/dissatisfaction field 36E. FIG. 7 illustrates an example in which when the arrangement of the corresponding virtual machine VM satisfies the corresponding affinity rule, "satisfaction" is stored in the condition satisfaction/dissatisfaction field 36E, and when the arrangement does not satisfy the corresponding affinity rule, "dissatisfaction" is stored.

When the arrangement of the corresponding virtual machine VM satisfies the corresponding affinity rule, an availability level of the arrangement of the virtual machine VM is stored in the fault tolerance level field 36F. For example, in a case where the corresponding virtual machine VM satisfies the corresponding affinity rule in a normal time but is migrated to another node 5 due to the failover caused by the fault occurrence, when the virtual machine does not satisfy the affinity rule, "medium" is stored in the fault tolerance level field. In a case where the corresponding virtual machine VM is migrated to another node 5 due to the failover caused by the fault occurrence, when the arrangement satisfies the affinity rule, "high" is stored in the fault tolerance level field 36F.

The storage controller management table 37 is a table used to manage an arrangement layout of the storage controllers 21 (FIG. 1) present in the corresponding cluster 4, and is created for each cluster 4. As illustrated in FIG. 8, the storage controller management table 37 includes a storage controller ID field 37A, a state field 37B, a storage controller group ID field 37C, a node ID field 37D, and a virtual machine ID field 37E. In the storage controller management table 37, one row corresponds to one storage controller 21 present in the corresponding cluster 4.

An identifier (storage controller ID) unique to the storage controller 21 assigned to the corresponding storage controller 21 is stored in the storage controller ID field 37A, and a current state of the storage controller 21 is stored in the state field 37B. The state of the storage controller 21 stored in the state field 37B includes "Active" indicating the active state, "Standby" indicating the standby state, and "Dead" indicating a fault state.

A storage controller ID of the storage controller group to which the corresponding storage controller 21 belongs is stored in the storage controller group ID field 37C, and a node ID of the node 5 in which the storage controller 21 is arranged is stored in the node ID field 37D. A virtual machine ID of the virtual machine VM (associated with the storage controller 5) for which the corresponding storage controller 5 performs the IO control is stored in the virtual machine ID field 37E.

Accordingly, in the case of the example of FIG. 8, the storage controller 21 in the "Active" state to which the storage controller ID "1" is assigned and the storage controller 21 in the "Standby" state to which the storage controller ID "2" is assigned constitute the storage controller group to which the storage controller group ID "1" is assigned. In FIG. 8, the storage controller 21 to which the storage controller ID "1" is assigned is associated with the virtual machine VM having the virtual machine ID "1" in the node 5 having the node ID "1", and the storage controller 21 to which the storage controller ID "2" is assigned is associated with the virtual machine VM having the virtual machine ID "2" in the node 5 having the node ID "2".

The pool configuration management table 34A (FIG. 5A), the volume configuration management table 34B (FIG. 5B), the node configuration management table 34C (FIG. 5C), the virtual machine management table 35 (FIG. 6), the affinity rule management table 36 (FIG. 7), and the storage controller management table 37 (FIG. 8) may be retained in synchronization such that all the nodes 5 constantly have the same content, or each node 5 may retain only the information regarding each node.

A format of the information stored in each of the pool configuration management table 34A, the volume configuration management table 34B, the node configuration management table 34C, the virtual machine management table 35, the affinity rule management table 36, and the storage controller management table 37 may be other formats such as a document format instead of the table format.

(1-3-2) Flow of Processing Associated with Virtual Machine Arrangement Determination Function Next, a flow of various kinds of processing executed in the cluster 4 of the information processing system 1 in association with the virtual machine arrangement determination function will be described with reference to FIGS. 9 to 13. Hereinafter, a processing subject of various kinds of processing will be described as the "program", but the CPU 10 (FIG. 2) of the corresponding node 5 executes the processing based on the "program" in reality.

(1-3-2-1) New Virtual Machine Arrangement Processing

Figure 9:
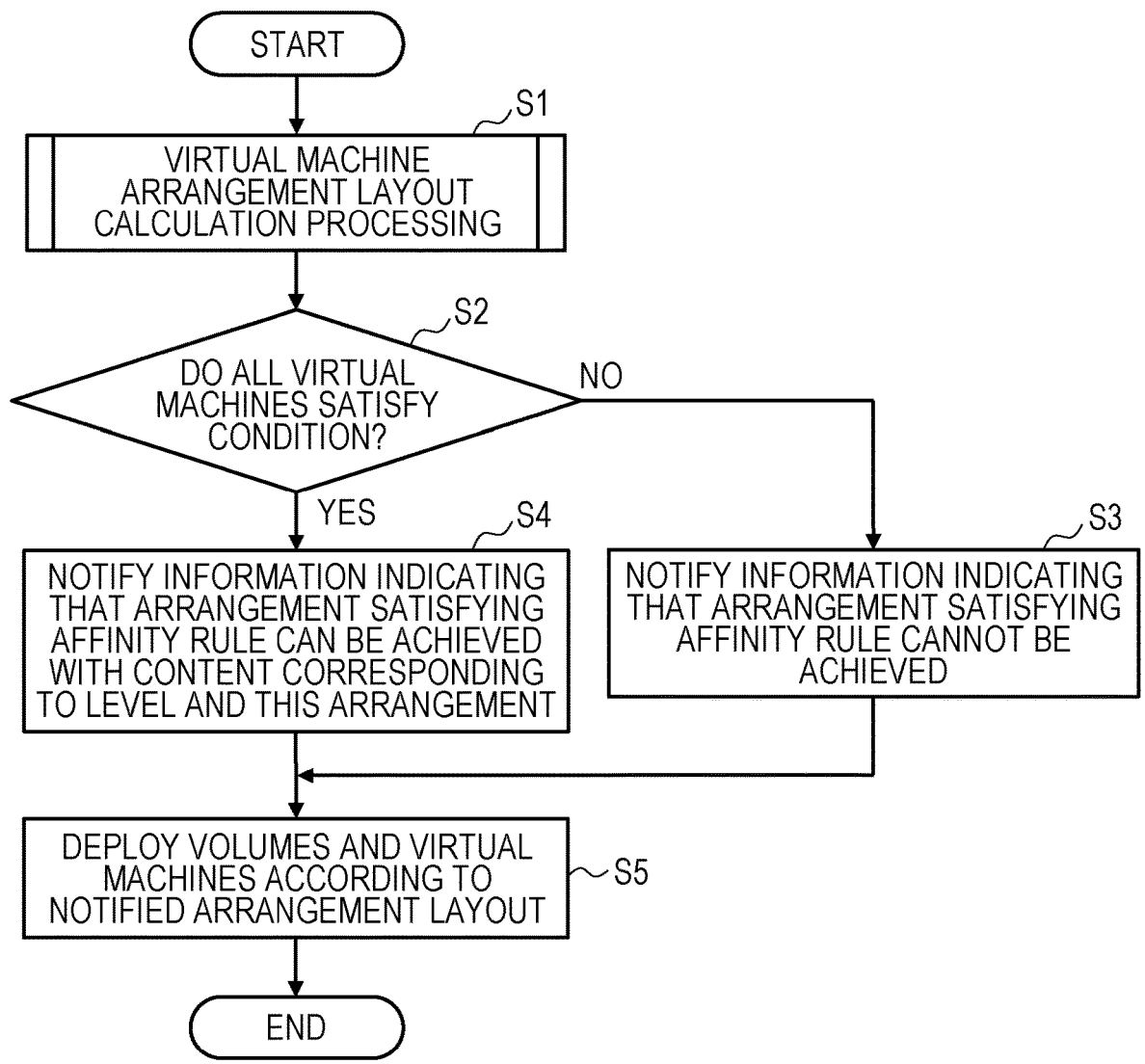
FIG. 9 is a flowchart illustrating a processing procedure of new virtual machine arrangement processing.

FIG. 9 illustrates a flow of new virtual machine arrangement processing executed by the virtual machine management program 33 in the node 5 when an instruction (hereinafter, referred to a new virtual machine creation instruction) to create one or a plurality of new virtual machines VM from the management server 3 is given to the node 5 in response to an operation of the system administrator or a request from the application operating on the management server 3.

In the new virtual machine creation instruction, the capacity of the volume VOL allocated to the virtual machine VM to be created at this time and the content of the affinity rule to be applied to the virtual machine VM are designated as conditions. The "content of affinity rule" mentioned herein refers to the rule type of the affinity rule, the node 5 in which the virtual machine VM to be created is to be arranged when the affinity rule is not the anti-affinity rule, and the virtual machine ID of the virtual machine VM not to be arranged in the same node 5 as the virtual machine VM to be created when the affinity rule is the anti-affinity rule.

The new virtual machine creation instruction may be given to any node 5 in the cluster 4 or the node (hereinafter, appropriately referred to as a representative node) 5 defined as a representative in the cluster 4 in advance. In any case, the virtual machine management program 33 of the node 5 that receives the new virtual machine creation instruction creates the new virtual machine VM satisfying the designated condition according to the processing procedure illustrated in FIG. 9.

Referring back to the description of FIG. 9, when the new virtual machine creation instruction is given, the virtual machine management program 33 starts the new virtual machine arrangement processing illustrated in FIG. 9, and first executes virtual machine arrangement layout calculation processing of calculating the arrangement layout of the virtual machine VM that does not violate the affinity rule designated in the new virtual machine creation instruction even when the failover occurs due to the fault occurrence (S1).

Figure 10A:
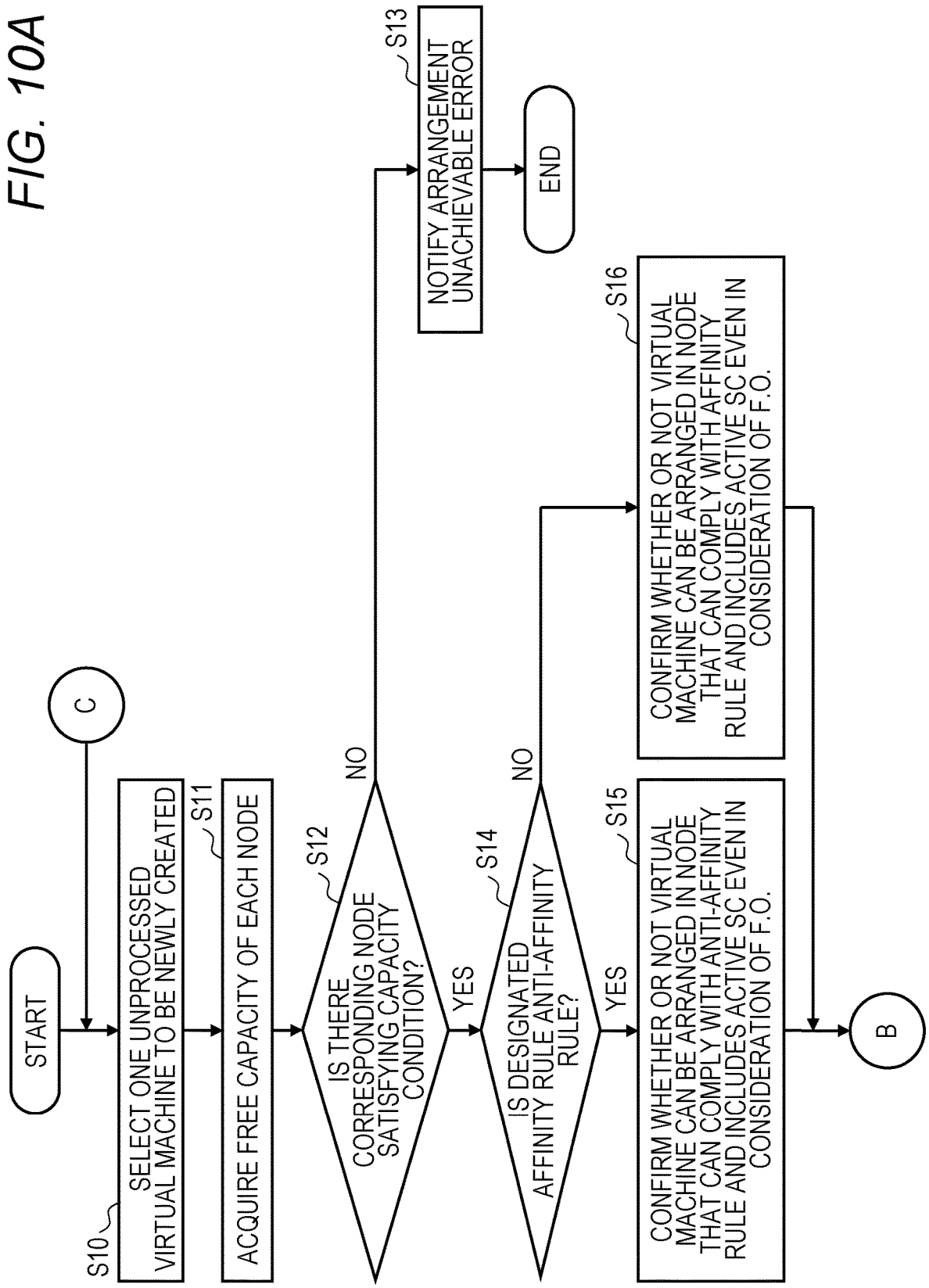
FIG. 10A is a flowchart illustrating a processing procedure of virtual machine arrangement layout calculation processing.
Figure 10B:
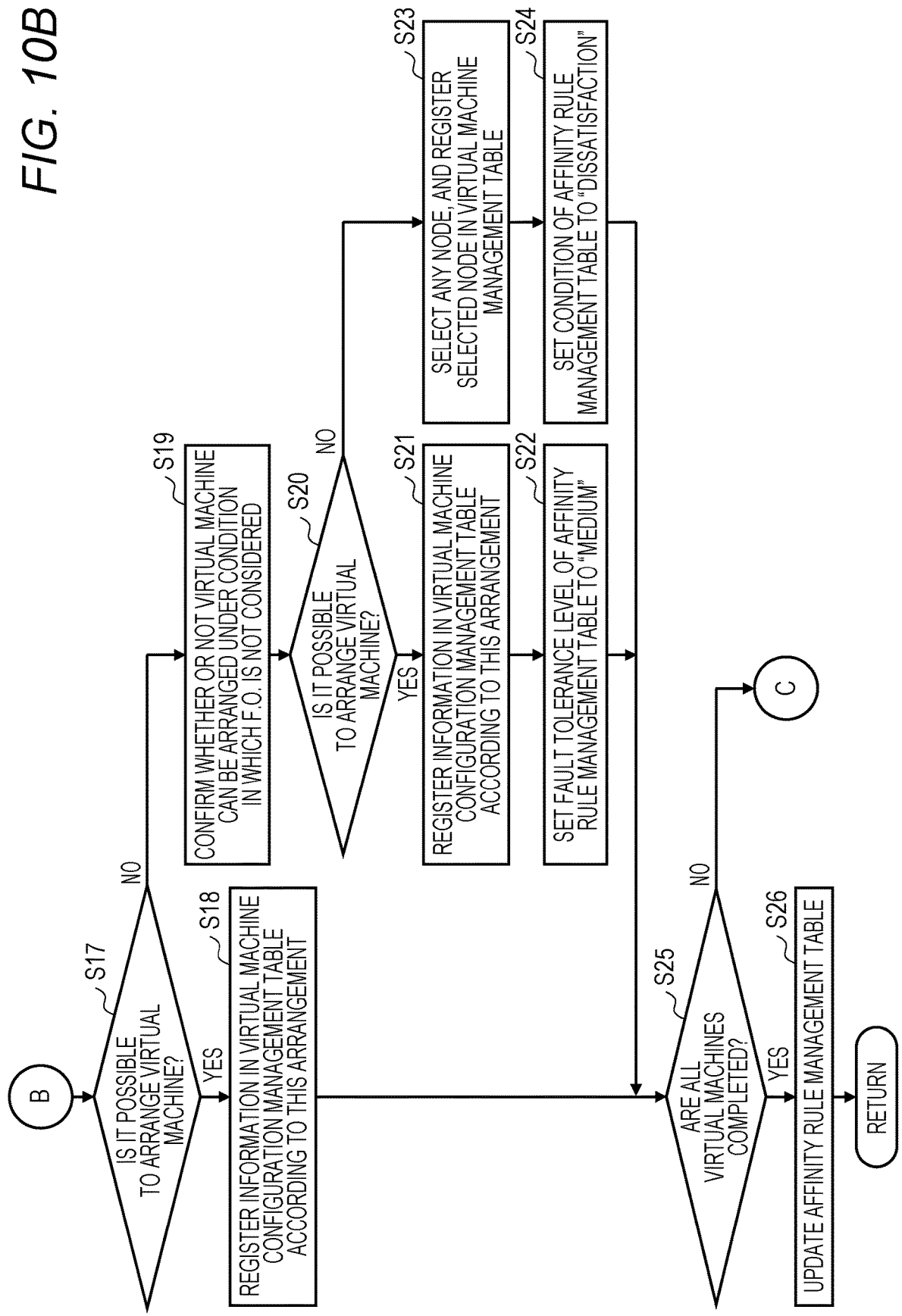
FIG. 10B is a flowchart illustrating a processing procedure of the virtual machine arrangement layout calculation processing.

Specifically, in the virtual machine arrangement layout calculation processing, the virtual machine management program 33 selects one virtual machine VM to be created which is not processed in step S11 and the subsequent steps among the virtual machines (hereinafter, referred to as to-be-created virtual machines) VM to be created designated in the new virtual machine creation instruction according to the processing procedure illustrated in FIGS. 10A and 10B (S10), and acquires the free capacity of the pool P1 in each node 5 from the pool configuration management table 34A (FIG. 5A) (S11).

Subsequently, the virtual machine management program 33 determines whether or not there is the corresponding node 5 satisfying the capacity of the volume VOL allocated to the to-be-created virtual machine (hereinafter, referred to as a selected to-be-created virtual machine in the description of FIGS. 10A and 10B) VM selected in step S10 for the selected to-be-created virtual machine VM designated in the new virtual machine creation instruction based on the free capacity of the pool PL in each node acquired in step S11 (S12).

Specifically, when the affinity rule designated in the new virtual machine creation instruction for the selected to-be-created virtual machine VM is not the anti-affinity rule, the virtual machine management program 33 determines whether or not there is the node 5 satisfying a condition (which is a condition of the capacity of the volume VOL allocated to the selected to-be-created virtual machine VM designated in the new virtual machine creation instruction, and hereinafter, referred to as a capacity condition) of the capacity from among the nodes 5 designated in the new virtual machine creation instruction for the selected to-be-created virtual machine VM.

When the affinity rule designated in the new virtual machine creation instruction for the selected to-be-created virtual machine VM is the anti-affinity rule, the virtual machine management program 33 determines whether or not there is the corresponding node 5 satisfying the capacity condition from all the nodes 5 in the cluster 4.

When a negative result is obtained in this determination, the virtual machine management program 33 notifies the management server 3 of an error indicating that the selected to-be-created virtual machine VM cannot be created (S13), and thereafter, the virtual machine arrangement layout calculation processing and the new virtual machine arrangement processing (FIG. 9) are ended.

In contrast, when a positive result is obtained in the determination of step S12, the virtual machine management program 33 determines whether or not the affinity rule designated in the new virtual machine creation instruction for the selected to-be-created virtual machine VM is the anti-affinity rule (S14).

When a positive result is obtained in this determination, the virtual machine management program 33 confirms whether or not the selected to-be-created virtual machine VM can be arranged in the node 5 that can comply with the affinity rule (anti-affinity rule) and includes the storage controller (active storage controller) 21 set in the active state of being associated with the selected to-be-created virtual machine VM in any case of the normal time and after the failover occurs among the nodes 5 satisfying the capacity condition of the selected to-be-created virtual machine VM while referring to the storage controller management table 37 (FIG. 8) (S15).

Specifically, the virtual machine management program 33 confirms whether or not there is the node 5 satisfying both the following conditions (A) and (B) among the corresponding nodes 5 satisfying the capacity condition of the selected to-be-created virtual machine VM.

(A) Any one of the active storage controller 21 associated with the virtual machine VM not to be arranged in the same node 5 as the selected to-be-created virtual machine VM designated in the new virtual machine creation instruction and the standby storage controller 21 belonging to the same storage controller group as the corresponding storage controller 21 are not arranged.

(B) There is the active storage controller 21 that can be associated with the selected to-be-created virtual machine VM, and the standby storage controller 21 belonging to the same storage controller group as the active storage controller 21 is arranged in the node 5 in which any one of the active storage controller 21 associated with the virtual machine VM not to be arranged in the same node 5 as the selected to-be-created virtual machine VM designated in the new virtual machine creation instruction and the standby storage controller 21 belonging to the same storage controller group as the corresponding storage controller 21 is not arranged.

When a negative result is obtained in the determination of step S12, the virtual machine management program 33 confirms whether or not the selected to-be-created virtual machine VM can be arranged in the node 5 that can comply with the affinity rule, satisfies the capacity condition designated for the selected to-be-created virtual machine VM, and includes the active storage controller 21 present therein in any case of the normal time and after the failover occurs while referring to the storage controller management table 37 (FIG. 8) (S16).

Specifically, the virtual machine management program 33 determines whether or not there is the node 5 in which there is the active storage controller 21 that can be associated with the selected to-be-created virtual machine VM and the standby storage controller 21 belonging to the same storage controller group as the corresponding active storage controller 21 is also arranged in the node 5 in which the selected to-be-created virtual machine VM designated in the new virtual machine creation instruction is to be arranged among the nodes 5 in which the selected to-be-created virtual machine VM designated in the new virtual machine creation instruction is to be arranged.

Thereafter, the virtual machine management program 33 determines whether or not it is confirmed that the "arrangement is achievable" in step S15 or step S16 (S17). When a positive result is obtained in this determination, the virtual machine management program 33 regards the selected to-be-created virtual machine VM as being arranged in any node 5 in which it is confirmed that the storage controller can be arranged in step S15 or step S16, and registers necessary information regarding the selected to-be-created virtual machine VM in the virtual machine management table 35 (FIG. 6) (S18). Thereafter, the virtual machine management program 33 proceeds to step S25.

In contrast, when a negative result is obtained in the determination of step S17, the virtual machine management program 33 confirms whether or not the selected to-be-created virtual machine VM can be arranged in any node 5 that can comply with the affinity rule designated for the selected to-be-created virtual machine VM only in the normal time and includes the active storage controller 21 that can be associated with the selected to-be-created virtual machine VM among the nodes 5 satisfying the capacity condition of the selected to-be-created virtual machine VM while referring to the node configuration management table group 34 (FIG. 4) and the storage controller management table 37 (FIG. 8) (S19).

Specifically, the virtual machine management program 33 confirms whether or not there is the node 5 satisfying both the following conditions (E) and (F) among the corresponding nodes 5 satisfying the capacity condition of the selected to-be-created virtual machine VM.

(E) The active storage controller 21 associated with the virtual machine VM not be arranged in the same node 5 as the selected to-be-created virtual machine VM designated in the new virtual machine creation instruction is not arranged.

(F) There is the active storage controller 21 that can be associated with the selected to-be-created virtual machine VM.

Subsequently, the virtual machine management program 33 determines whether or not it is confirmed that "arrangement is achievable" in step S17 (S20). when a positive result is obtained in this determination, the virtual machine management program 33 regards the selected to-be-created virtual machine VM as being arranged in any node 5 in which it is confirmed that the arrangement can be achieved in step S19, and registers the necessary information regarding the selected to-be-created virtual machine VM in the virtual machine management table 35 (S21).

The virtual machine management program 33 sets "medium" indicating that the virtual machine can comply with the affinity rule in the normal time but violates the affinity rule when the fault occurs in the fault tolerance level field 36F (FIG. 7) of the row corresponding to the affinity rule to be applied to the selected to-be-created virtual machine VM among the rows of the affinity rule management table 36 (FIG. 7) (S22), and thereafter, the processing proceeds to step S25.

In contrast, when a negative result is obtained in the determination of step S20, the virtual machine management program 33 selects any node 5 from among the corresponding nodes 5 satisfying the capacity condition of the selected to-be-created virtual machine VM, regards the selected to-be-created virtual machine VM as being arranged in the node 5, and registers the necessary information regarding the selected to-be-created virtual machine VM in the virtual machine management table 35 (S23).

The virtual machine management program 33 stores "dissatisfaction" indicating that the virtual machine violates the affinity rule in any case of the normal time and the fault occurrence in the condition satisfaction/dissatisfaction field 36E (FIG. 7) of the row corresponding to the affinity rule to be applied to the selected to-be-created virtual machine VM among the rows of the affinity rule management table 36 (S24), and thereafter, the processing proceeds to step S25.

When processing proceeds to step S25, the virtual machine management program 33 determines whether or not the execution of the processing of step S12 to step S24 is ended for all the to-be-created virtual machines VM (S25). When a negative result is obtained in this determination, the virtual machine management program 33 returns to step S10, and thereafter, repeats the processing of step S10 to step S25 while sequentially switching the to-be-created virtual machine VM which is selected in step S10 to another to-be-created virtual machine VM which is unprocessed in step S12 and the subsequent steps.

When a positive result is obtained in step S25 by eventually ending the execution of the processing of step S12 to step S24 for all the to-be-created virtual machines VM, the virtual machine management program 33 stores "satisfaction" in each of all the condition satisfaction/dissatisfaction fields 36E being empty fields in the affinity rule management table 36, and sets "high" in each of the fault tolerance level fields 36F of all the rows being empty fields of the fault tolerance level field 36F in the rows in which "satisfaction" is stored in the condition satisfaction/dissatisfaction fields 36E (S26). Thereafter, the virtual machine management program 33 ends the virtual machine arrangement layout calculation processing, and returns to the new virtual machine arrangement determination processing (FIG. 9).

When the processing returns to the new virtual machine arrangement determination processing, the virtual machine management program 33 determines whether or not the arrangement layout of the to-be-created virtual machines VM which is calculated in step S1 satisfies all the conditions requested for the to-be-created virtual machines VM while referring to the affinity rule management table 36 (S2).

When a negative result is obtained in this determination, the virtual machine management program 33 notifies the management server 3 of the arrangement layout of the to-be-created virtual machines VM which is calculated in step S1 and information indicating which condition (here, the affinity rule) among the conditions of the to-be-created virtual machine VM is not satisfied by the corresponding arrangement layout (S3), and thereafter, the processing proceeds to step S5.

In contrast, when a positive result is obtained in the determination of step S2, the virtual machine management program 33 notifies the management server 3 of the fault tolerance level of the to-be-created virtual machines, information indicating that the to-be-created virtual machines satisfy the affinity rule with the content corresponding to the fault tolerance level (that is, information indicating that the virtual machine satisfies the affinity rule in any case of the normal time and the fault occurrence when the fault tolerance level is "high" and satisfies the affinity rule only in the normal time when the fault tolerance level is "medium"), and the arrangement layout of the to-be-created virtual machines VM which is calculated in step S1 (S4), and thereafter, the processing proceeds to step S5.

Thereafter, the virtual machine management program 33 executes processing of deploying the to-be-created virtual machines VM in the corresponding node 5 according to the arrangement layout calculated in step S1 and creating the volumes VOL allocated to the to-be-created virtual machines VM in the node 5 in which the corresponding to-be-created virtual machines VM are deployed (S5).

Specifically, the virtual machine management program 33 deploys the virtual machines VM when the to-be-created virtual machines VM are to be created in the own node 5, and gives an instruction to deploy the virtual machines VM to the virtual machine management program 33 of the node 5 when the to-be-created virtual machines VM are to be created in another node 5.

When a new virtual machine VM is deployed in the own node 5 together with the deployed virtual machines, the virtual machine management program 33 gives an instruction to create the volume VOL allocated to the corresponding virtual machine VM to the storage management program 32 (FIG. 4) in the own node 5, and when the new virtual machine VM is deployed in another node 5, the virtual machine management program gives an instruction to create the volume VOL allocated to the corresponding virtual machine VM to the storage management program 32 in this node 5.

Thereafter, the virtual machine management program 33 ends the new virtual machine arrangement processing.

(1-3-2-2) Virtual Machine Migration Processing

Figure 11:
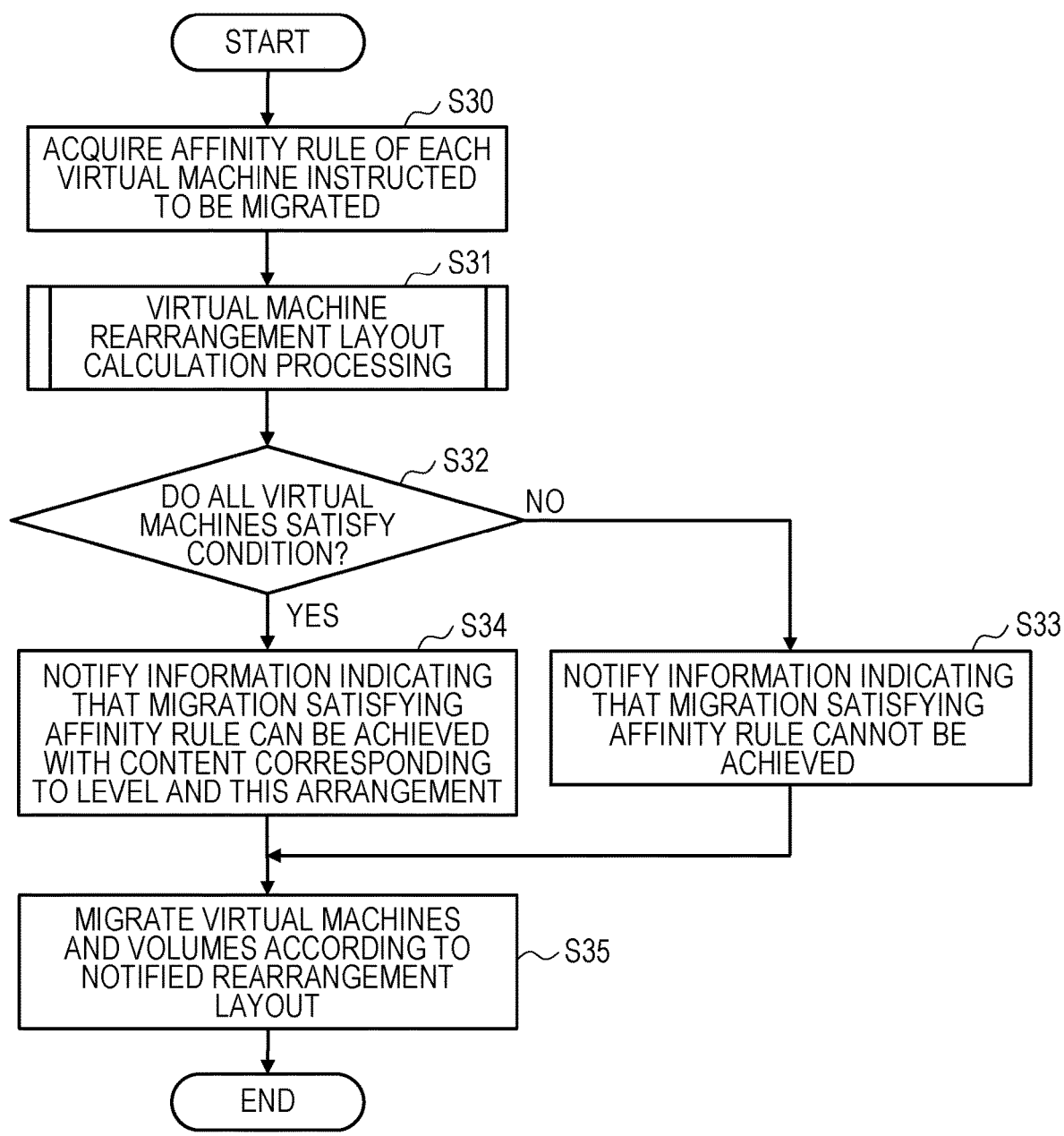
FIG. 11 is a flowchart illustrating a processing procedure of virtual machine migration processing.

Meanwhile FIG. 11 illustrates a flow of virtual machine migration processing executed by the virtual machine management program 33 when an instruction (hereinafter, referred to as a virtual machine migration instruction) to migrate one or the plurality of existing virtual machines VM to another node 5 is given from the management server 3 in response to an operation of the system administrator or a request from the application installed on the management server 3.

A case where such a virtual machine migration instruction is given from the management server 3 to the node 5 is a case where when a load is imbalanced among the nodes 5 and a load of a specific node 5 becomes larger than the loads of other nodes 5, the loads are balanced among the nodes 5 in the cluster 4 by migrating a part of the virtual machines VM operating on the specific node 5 to another node 5. The virtual machine is migrated not only in order to balance the loads but also in order to eliminate the imbalance among any items (number of volumes VOL and used capacity) in operation.

Similarly to the new virtual machine creation instruction, the virtual machine migration instruction may be given to any node 5 or the representative node 5 in the cluster 4. In any case, the virtual machine management program 33 of the node 5 that receives the virtual machine migration instruction executes processing of migrating the designated virtual machine VM to another node 5 according to the processing procedure illustrated in FIG. 11.

In practice, when the virtual machine migration instruction that designates one or the plurality of virtual machines VM (hereinafter, referred to as migration target virtual machines) as migration targets is given from the management server 3, the virtual machine management program 33 starts the virtual machine migration processing illustrated in FIG. 11, and first, acquires the affinity rule of the migration target virtual machines VM designated in the virtual machine migration instruction from the affinity rule management table 36 (FIG. 7) (S30).

Subsequently, the virtual machine management program 33 executes virtual machine rearrangement layout calculation processing of calculating a rearrangement destination that does not violate the affinity rule set for the migration target virtual machine VM even though the failover caused by the fault occurrence occurs for each migration target virtual machine VM (S31). The virtual machine rearrangement layout calculation processing has the same processing content as the virtual machine arrangement layout calculation processing described with reference to FIGS. 10A and 10B except that the "to-be-created virtual machine" is replaced with a "migration target virtual machine" in the description of the virtual machine arrangement layout calculation processing, and thus, detailed description thereof will be omitted.

Thereafter, the virtual machine management program 33 executes processing of step S32 to step S34 similarly to step S2 to step S4 of FIG. 9. Thereafter, the virtual machine management program 33 executes processing of migrating each virtual machine VM as the migration target and the volume VOL allocated to the corresponding virtual machine VM to another node 5 according to the rearrangement layout calculated in step S31 (S35).

Specifically, when the migration target virtual machine VM is to be migrated from another node 5 to the own node 5, the virtual machine management program 33 gives an instruction to the storage management program 32 (FIG. 4) in the own node 5 such that the data stored in the volume VOL allocated to the migration target virtual machine VM is copied, specifically, the volume VOL is created in the own node 5 and the data stored in the volume VOL allocated to the migration target virtual machine VM is copied to the created volume VOL (FIG. 4). Thereafter, the volume VOL to which the data is copied is recognized as the DS of the own node 5, and is deployed as the virtual machine VM of the own node 5.

When the migration target virtual machine VM is to be migrated from the own node 5 or another node 5 to another node 5, the virtual machine management program 33 gives an instruction to the storage management program 32 (FIG. 4) in the own node 5 such that the volume VOL is created in the own node 5 and the data stored in the volume VOL allocated to the migration target virtual machine VM is copied to the created volume VOL. Thereafter, an instruction is given to the virtual machine management program 33 of the migration destination such that the volume VOL to which the data is copied is recognized as the DS of another node 5 and is deployed as the virtual machine VM of another node 5.

Thereafter, the virtual machine management program 33 ends the virtual machine migration processing.

(1-3-2-3) First Virtual Machine Arrangement Review Processing

Figure 12:
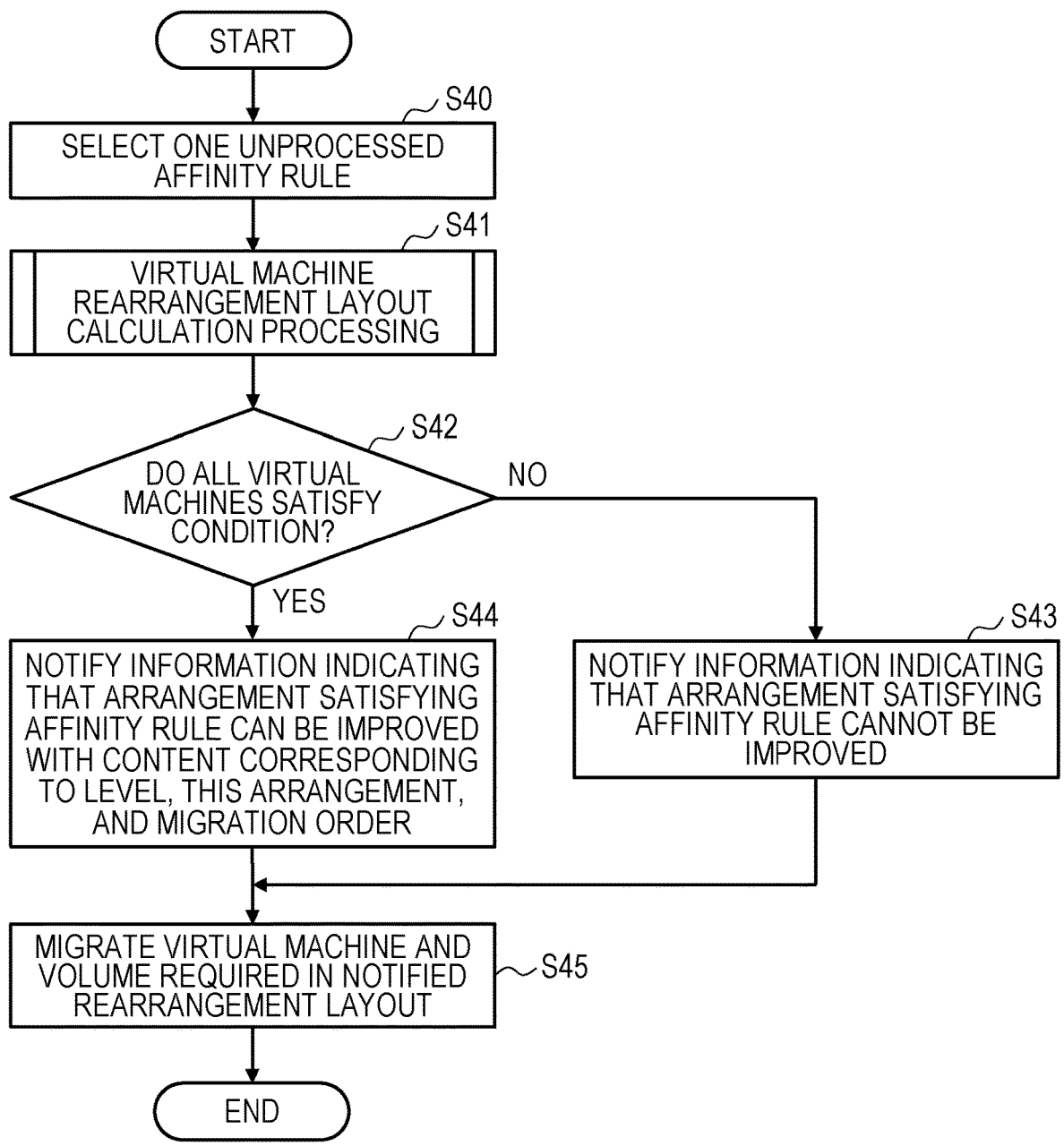
FIG. 12 is a flowchart illustrating a processing procedure of first virtual machine arrangement review processing.

Meanwhile, FIG. 12 illustrates a flow of first virtual machine arrangement review processing executed by the virtual machine management program 33 in a case where a first virtual machine arrangement review instruction indicating that the arrangement of the virtual machines VM is to be reviewed from the management server 3 is given in response to an operation of the system administrator or a request from the application installed on the management server 3 when a configuration of the cluster 4 is changed by increasing or decreasing the number of nodes 5 in the cluster 4.

When the configuration of cluster 4 is changed by increasing or decreasing the number of nodes 5, even though any virtual machine VM does not satisfy the affinity rule before the configuration change, the affinity rule may be satisfied after the configuration change or any virtual machine VM may not satisfy the affinity rule after the configuration change in an opposite case. Accordingly, when the configuration of the cluster 4 is changed, it is necessary to review the arrangement of the virtual machines VM, and thus, the first virtual machine arrangement review processing is executed.

Similarly to the new virtual machine creation instruction and the virtual machine migration instruction, the first virtual machine arrangement review instruction may be given to any node 5 or the representative node 5 in the cluster 4. In any case, the virtual machine management program 33 of the node 5 that receives the first virtual machine arrangement review instruction executes processing of examining the current arrangement of the virtual machines VM in the cluster 4 according to the processing procedure illustrated in FIG. 12 and migrating a part or all of the virtual machines VM to another node 5 as necessary.

Hereinafter, although it will be described that configuration information (information such as the number of nodes 5 and the free capacity of each node 5 after the configuration change) of a new cluster 4 after the configuration change is included in the first virtual machine arrangement review instruction, the node 5 that receives the virtual machine arrangement review instruction may acquire new configuration information of the cluster 4 by communicating with each node 5 in the cluster 4.

When the configuration information of the new cluster 4 after the configuration change is included in the first virtual machine arrangement review instruction, the virtual machine management program 33 updates the node configuration management table group 34 (FIG. 4) in the own node 5 according to the configuration information of the new cluster 4 included in the first virtual machine arrangement review instruction, and executes the first virtual machine arrangement review processing of FIG. 12 after an instruction is given to another node 5 such that the node configuration management table group 34 retained by the node another node 5 is similarly changed. However, after the system administrator updates the node configuration management table group 34 in each node 5, the management server 3 may give the first virtual machine arrangement review instruction to the corresponding node 5 in response to an operation of the system administrator.

Referring back to the description of FIG. 12, when the first virtual machine arrangement review instruction is given from the management server 3, the virtual machine management program 33 starts the first virtual machine arrangement review processing illustrated in FIG. 12, and first selects one affinity rule unprocessed in step S42 and the subsequent steps from among the affinity rules registered in the affinity rule management table 36 (FIG. 7) (S40).

Subsequently, the virtual machine management program 33 calculates the rearrangement layout of the virtual machines VM in the new cluster configuration so as not to violate a selected affinity rule even when the failover occurs in any storage controller group in the cluster 4 for the affinity rule (hereinafter, referred to as a selected affinity rule in the description of FIG. 12) selected in step S40 while referring to the virtual machine management table 35 (FIG. 6) (S41).

The rearrangement layout can be calculated similarly to the virtual machine arrangement layout calculation processing described with reference to FIGS. 10A and 10B, and thus, detailed description of step S41 here will be omitted. However, in the virtual machine rearrangement layout calculation processing executed in step S41 of the first virtual machine arrangement review processing, there is a difference in which the virtual machine VM unprocessed in step S12 and the subsequent steps is selected from among the existing virtual machines VM in the cluster 4 in step S10 of FIG. 10A.

Thereafter, the virtual machine management program 33 executes processing step S42 to step S44 similarly to step S32 to step S34 of FIG. 11.

Thereafter, similarly to step S35 of FIG. 11, the virtual machine management program 33 executes processing of migrating each virtual machine VM as the migration target and the volume VOL allocated to the corresponding virtual machine VM according to the rearrangement layout calculated in step S41 to another node 5 (S45), and ends the first virtual machine arrangement review processing.

The first virtual machine arrangement review processing may be executed in order to determine whether or not the cluster configuration is to be changed before the configuration of the cluster 4 is actually changed. In this case, the processing of step S45 will be omitted.

(1-3-2-4) Second Virtual Machine Arrangement Review Processing

Figure 13:
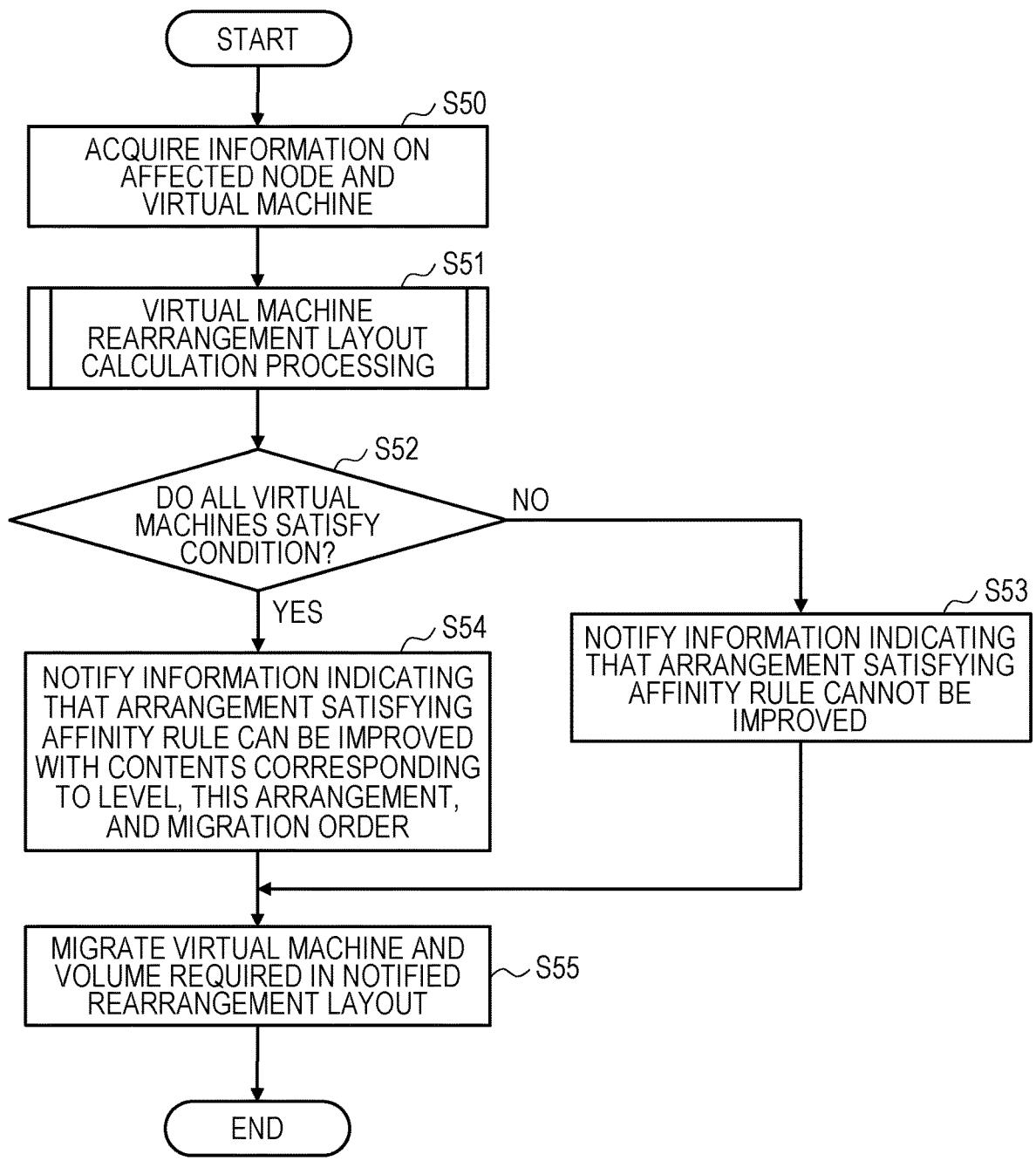
FIG. 13 is a flowchart illustrating a processing procedure of second virtual machine arrangement review processing.

FIG. 13 illustrates a flow of second virtual machine arrangement review processing executed by the virtual machine management program 33 in a case where a second virtual machine arrangement review instruction to review the arrangement of the virtual machines VM from the management server 3 is given in response to an operation of the system administrator or a request from the application installed on the management server 3 when any affinity rule is changed such as the increase or decrease in the number of nodes 5 or the number of virtual machines VM as the targets.

When any affinity rule is changed, even though there is the virtual machine VM that does not satisfy the affinity rule before the change, the virtual machine VM may satisfy the affinity rule after the change, or any virtual machine VM may not satisfy the affinity rule after the change in an opposite case. Accordingly, when the affinity rule is changed, it is necessary to review the arrangement of the virtual machines VM, and thus, the second virtual machine arrangement review processing is executed.

Similarly to the new virtual machine creation instruction and the virtual machine migration instruction, the second virtual machine arrangement review instruction may be given to any node 5 or the representative node 5 in the cluster 4. In any case, the virtual machine management program 33 of the node 5 that receives the second virtual machine arrangement review instruction executes processing of examining the current arrangement of the virtual machines VM in the cluster 4 according to the processing procedure illustrated in FIG. 13 and migrating a part or all of the virtual machines VM to another node 5 if necessary.

Hereinafter, it is assumed that a new affinity rule after the change is included in the second virtual machine arrangement review instruction. When the new affinity rule after the change is included in the second virtual machine arrangement review instruction, the virtual machine management program 33 updates the affinity rule management table 36 (FIG. 7) in the own node 5 according to the new affinity rule included in the second virtual machine arrangement review instruction, and executes the second virtual machine arrangement review processing of FIG. 13 after an instruction is given to another node 5 such that the affinity rule management table 36 retained by that node 5 is similarly changed. However, after the system administrator updates the affinity rule management table 36 in each node 5, the second virtual machine arrangement review instruction may be given from the management server 3 to the corresponding node 5 in response to the operation of the system administrator.

Referring back to the description of FIG. 13, when the second virtual machine arrangement review instruction is given from the management server 3, the virtual machine management program 33 starts the second virtual machine arrangement layout review processing illustrated in FIG. 13, and first acquires the node ID of the node 5 affected by the changed affinity rule and the virtual machine ID of the affected virtual machine VM from the affinity rule management table 36 while referring to the updated affinity rule management table 36 (S50).

Thereafter, the virtual machine management program 33 executes processing of step S51 to step S54 similarly to step S41 to step S44 of the first virtual machine arrangement review processing described with reference to FIG. 12. However, in the virtual machine rearrangement layout calculation processing executed in step S51 of the second virtual machine arrangement review processing, there is a difference in that the virtual machine VM unprocessed in step S12 and the subsequent steps is selected from among the virtual machines VM of which the virtual machine IDs are acquired in step S50 in step S10 of FIG. 10A.

Thereafter, similarly to step S37 of FIG. 11, the virtual machine management program 33 executes processing of migrating each virtual machine VM as the migration target and the volume VOL allocated to the corresponding virtual machine VM according to the rearrangement layout calculated in step S51 to another node 5 (S55), and ends the second virtual machine arrangement review processing.

The second virtual machine arrangement review processing may be executed in order to determine whether or not the affinity rule is to be changed before the affinity rule is actually changed. In this case, the processing of step S55 will be omitted.

(1-4) Effects of Present Embodiment

As described above, in the information processing system 1 of the present embodiment, the arrangement destination or the migration destination of each virtual machine VM is determined so as not to violate the affinity rule (anti-affinity rule) designated for each virtual machine VM while maintaining the locality even when the failover caused by the fault occurrence occurs while referring to the storage controller management table 37 (FIG. 37) in which the information of the arrangement layout of the storage controller 5 is stored.

Accordingly, according to the information processing system 1, it is possible to realize the information processing system with high reliability and high availability that can constantly comply with the affinity rule designated for each virtual machine VM.

(2) Second Embodiment

In the new virtual machine arrangement processing of the first embodiment described with reference to FIG. 9, in the current cluster configuration, the capacity of the volume VOL designated for any to-be-created virtual machine VM and the condition of the node 5 of the arrangement destination are not satisfied. However, when the storage device 12 is added to the node 5 or the number of nodes 5 itself is increased, the conditions of all the to-be-created virtual machines VM may be satisfied.

Thus, hereinafter, an example in which an improvement proposal presentation function of presenting an improvement proposal of the cluster configuration such as the addition of the storage device to the node 5 or the increase in the number of nodes 5 is added to the information processing system 1 according to the first embodiment in such a case will be described.

In FIG. 1, a reference numeral 40 indicates an information processing system according to the present embodiment as a whole. The information processing system 40 has the same configuration as the information processing system 1 according to the first embodiment except that the improvement proposal presentation function is installed on each node 41 or a representative node 41 constituting the cluster 4.

Figures 14, 15:
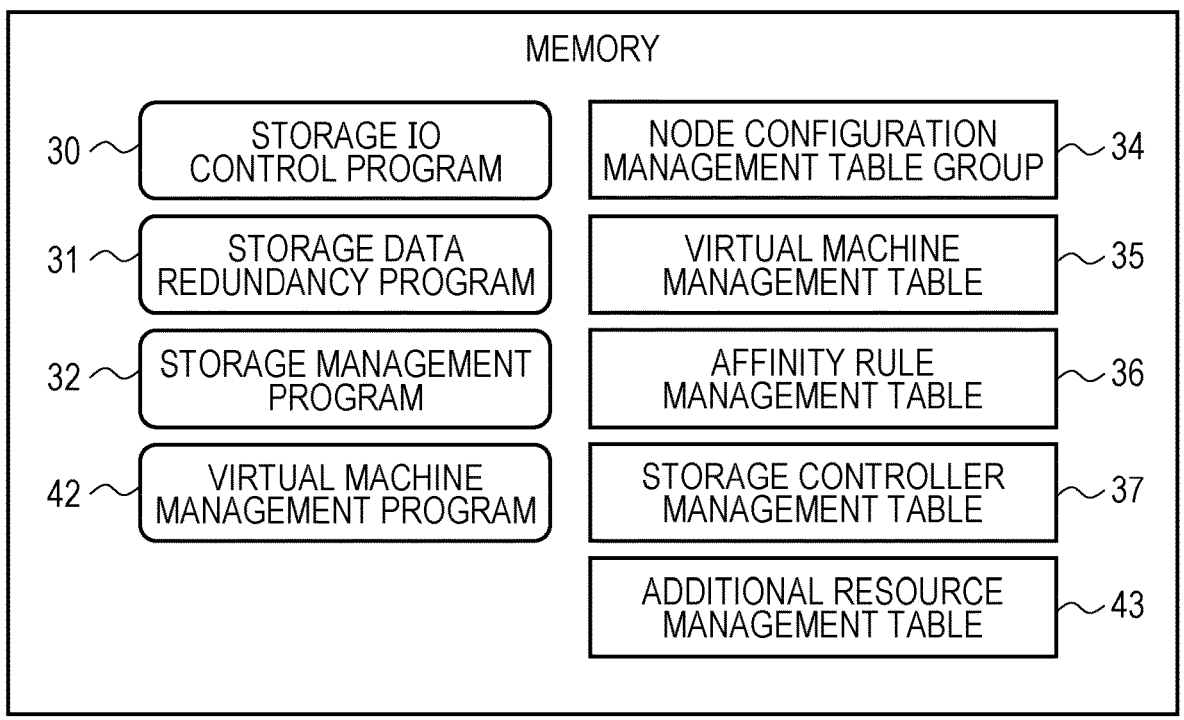
FIG. 14 is a block diagram for describing programs and control information stored in a memory of the node according to the second embodiment.
FIG. 15 is a chart illustrating a configuration example of an additional resource management table.

FIG. 14 in which portions corresponding to those in FIG. 4 are assigned the same reference numerals illustrates a configuration of programs and control information in the memory 11 of the node 41 having the improvement proposal presentation function. As illustrated in FIG. 14, a virtual machine management program 42 and an additional resource management table 43 in addition to the storage ID control program 30, the storage data redundancy program 31, the storage management program 32, the node configuration management table group 34, the virtual machine management table 35, the affinity rule management table 36, and the storage controller management table 37 are stored in the memory 11 of the node 41 of the present embodiment.

The virtual machine management program 42 is a program having a function of creating the data store DS or the virtual machine VM based on the instruction given from the management server 3 in response to an operation of the system administrator or a request from the application installed on the management server 3 and migrating the created virtual machine VM to another node 5. The virtual machine management program 42 has the same function as the virtual machine management program 33 (FIG. 4) of the first embodiment except that an improvement proposal presentation function to be described later is installed.

Figure 17A:
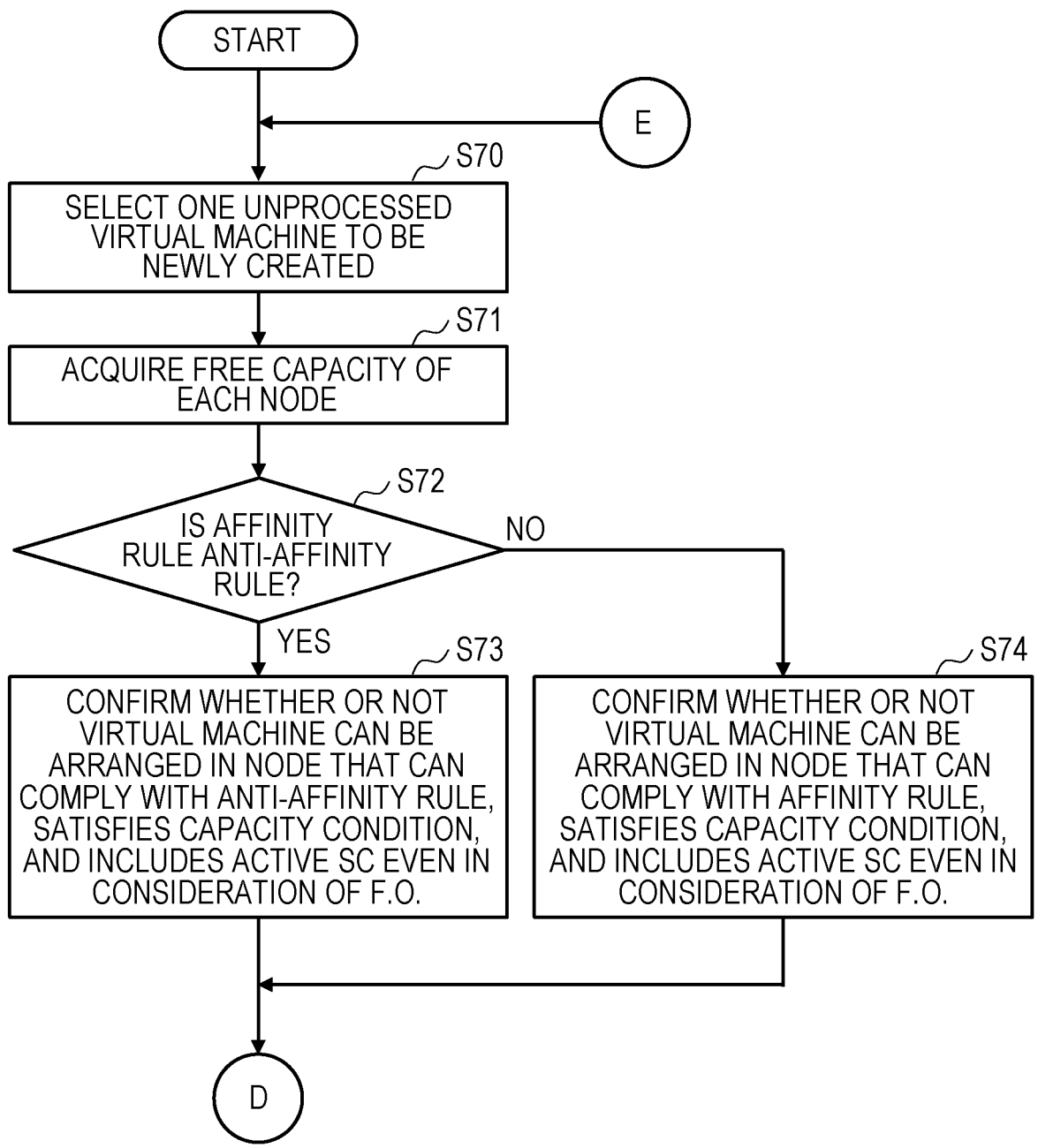
FIG. 17A is a flowchart illustrating a processing procedure of improvement proposal presentation processing.
Figure 17B:
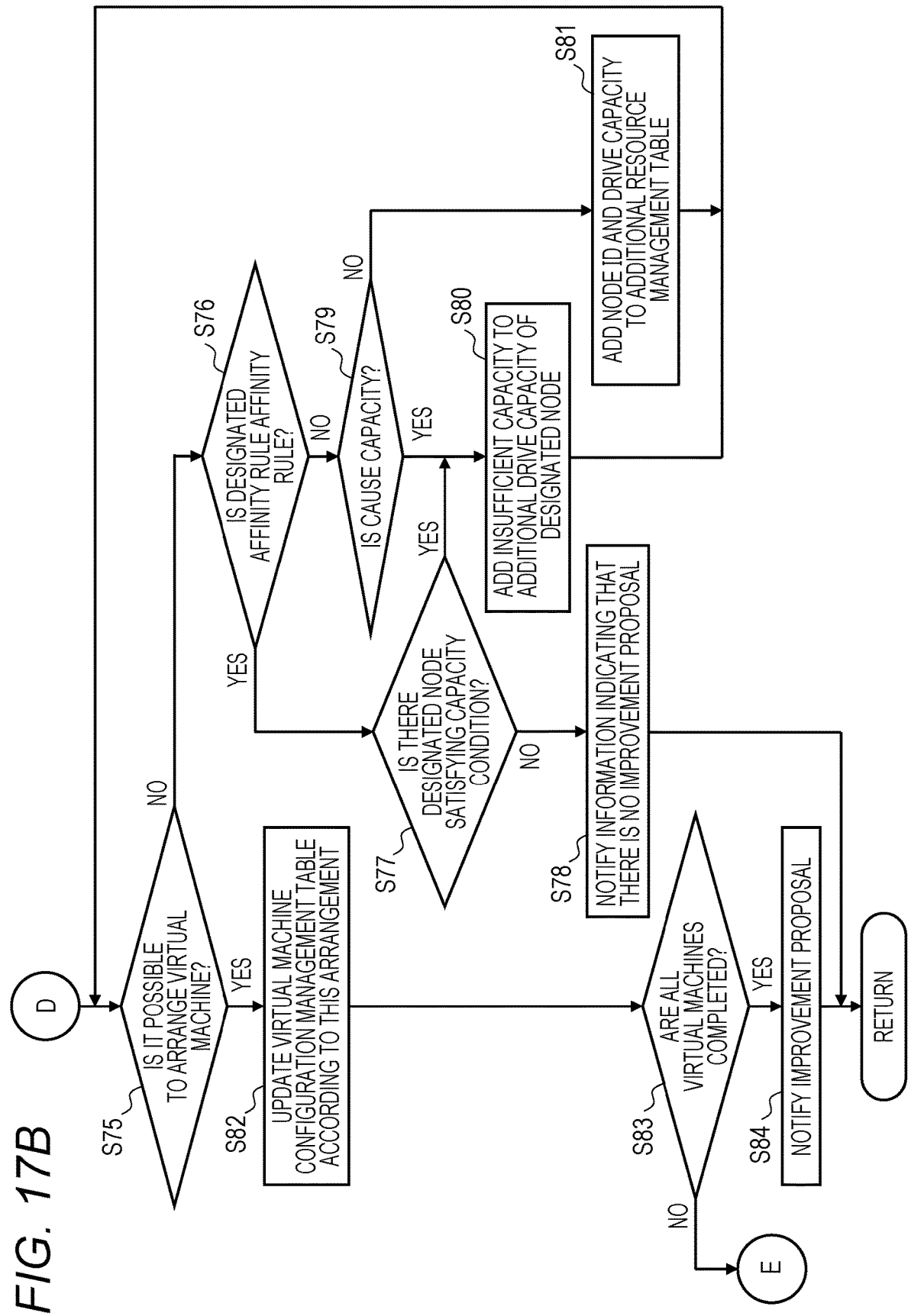
FIG. 17B is a flowchart illustrating a processing procedure of the improvement proposal presentation processing.

The additional resource management table 43 is a table used to manage resources additionally required to satisfy the affinity rule calculated for each affinity rule which is calculated when the improvement proposal presentation processing to be described with reference to FIGS. 17A and 17B is executed, and includes an affinity rule ID field 43A, a node ID field 43B, and an additional drive capacity field 43C as illustrated in FIG. 15. In the additional resource management table 43, one row corresponds to one affinity rule.

An affinity rule ID of the corresponding affinity rule is stored in the affinity rule ID field 43A. A node ID of the node 41 to which the storage device 12 is to be added is stored in the node ID field 43B when the storage device 12 is to be added to the corresponding node 41 in order to satisfy the corresponding affinity rule, and a node ID of the node 41 to be newly added is stored when the node 41 itself is to be added in order to satisfy the corresponding affinity rule. The storage capacity to be added to the corresponding node 41 in order to satisfy the corresponding affinity rule is stored in the additional drive capacity field 43C.

The "node ID of the node 41 to be newly added" stored in the node ID field 43B is a node ID unique to the corresponding node 41 assigned to this node 41 at this time, and this node ID is stored in the node ID field 43B of the additional resource management table 43.

Accordingly, when the node ID stored in the node ID field 43B is present in the node configuration management table 34C (FIG. 5C) of the node configuration management table group 34 (FIG. 4) and the storage capacity is stored in the additional drive capacity field 42C, the storage device 12 of the storage capacity stored in the additional drive capacity field 43C in the same row is to be added to the node 41 in which the node ID is stored in the node ID field 43B in this row. When the node ID stored in the node ID field 43B is not present in the node configuration management table 34C of the node configuration management table group 34, the node 41 having this node ID is to be newly added.

Figure 16:
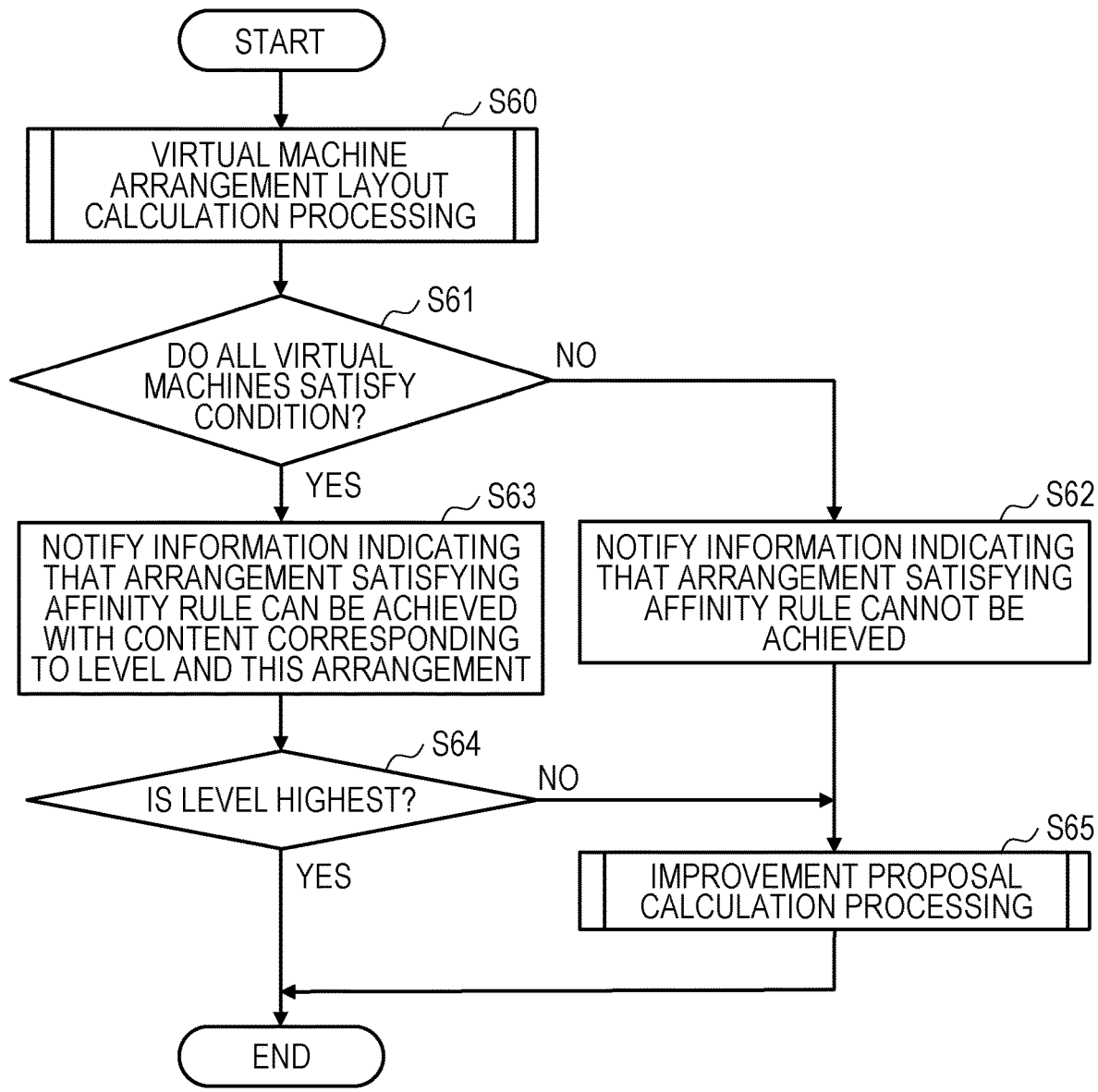
FIG. 16 is a flowchart illustrating a processing procedure of new virtual machine arrangement destination determination processing.

FIG. 16 illustrates a flow of new virtual machine arrangement destination determination processing executed by the virtual machine management program 42 of the present embodiment when an instruction (hereinafter, referred to as a new virtual machine arrangement destination determination instruction) to determine the arrangement destination of the new virtual machine from the management server 3 is given in response to an operation of the system administrator or a request from the application operating on the management server 3. The virtual machine management program 42 of the node 41 to which the new virtual machine arrangement destination determination instruction is given determines the arrangement destination of each to-be-created virtual machine VM which is designated in the new virtual machine arrangement destination instruction according to the processing procedure illustrated in FIG. 16 or presents the improvement proposal of the cluster configuration if necessary.

The new virtual machine arrangement destination determination instruction may be given to any node 41 or the representative node 41 in the cluster 4. In any case, the virtual machine management program 42 of the node 41 that receives the new virtual machine arrangement destination determination instruction determines the arrangement destination of each virtual machine (to-be-created virtual machine) VM to be created which satisfies the designated condition according to the processing procedure illustrated in FIG. 16 or presents the improvement proposal of the cluster configuration.

Referring back to the description of FIG. 16, when the new virtual machine arrangement destination determination instruction is given, the virtual machine management program 42 starts the new virtual machine arrangement destination determination processing illustrated in FIG. 16, and executes step S60 and step S61 similarly to step S1 and step S2 of the new virtual machine arrangement processing of the first embodiment described with reference to FIG. 9.

When a negative result is obtained in the determination of step S61, the virtual machine management program 42 notifies the management server 3 of the arrangement layout of the to-be-created virtual machines VM calculated in step S1 and information indicting which condition (here, the affinity rule) among the conditions of the to-be-created virtual machines VM is not satisfied by the corresponding arrangement layout (S62), and thereafter, the processing proceeds to step S65.

When a positive result is obtained in the determination of step S61, the virtual machine management program 42 notifies the management server 3 of the fault tolerance level of the to-be-created virtual machines VM, information (that is, information indicating that the affinity rule is satisfied in any case of the normal time and the fault occurrence when the fault tolerance level is "high" and the affinity rule only in the normal time when the fault tolerance level is "medium") indicating that the to-be-created virtual machines VM satisfy the affinity rule with the content corresponding to the tolerance fault level, and the arrangement layout of the to-be-created virtual machines VM calculated in step S61 (S63).

Subsequently, the virtual machine management program 42 determines whether or not "high" is set in the fault tolerance level fields 36F of all the rows of the affinity rule management table 36 (whether or not the fault tolerance levels of all the affinity rules are "high") (S64). When a positive result is obtained in this determination, the virtual machine management program 42 ends the new virtual machine arrangement destination determination processing.

In contrast, when a negative result is obtained in the determination of step S64, the virtual machine management program 42 executes improvement proposal calculation processing of calculating the improvement proposal for setting the fault tolerance levels of all the affinity rules are "high" and notifying the management server 3 of the improvement proposal (S65). Thereafter, the virtual machine management program 42 ends the new virtual machine arrangement destination determination processing.

FIGS. 17A and 17B illustrate a specific processing content of the improvement proposal calculation processing executed by the virtual machine management program 42 in step S67 of the new virtual machine arrangement destination determination processing. When the processing proceeds to step S67 of the new virtual machine arrangement destination determination processing, the virtual machine management program 42 starts the improvement proposal calculation processing illustrated in FIGS. 17A and 17B.

First, the virtual machine management program 42 executes step S70, step S71, and step S72 to step S75 similarly to steps S10, S11, and S14 and step S17 of the virtual machine arrangement layout calculation processing described with reference to FIGS. 10A and 10B.

When a negative result is obtained in the determination of step S75, the virtual machine management program 42 determines whether or not the affinity rule designated in the new virtual machine arrangement destination determination instruction for the to-be-created virtual machine (hereinafter, referred to as a selected to-be-created virtual machine in the description of FIGS. 17A and 17B) VM selected in step S70 is the affinity rule (S76).

When a positive result is obtained in this determination, the virtual machine management program 42 determines whether or not there is the node 41 in which the free capacity of the pool PL acquired in step S71 is equal to or greater than the capacity requested for the selected to-be-created virtual machine VM (S77). When a positive result is obtained in this determination, the virtual machine management program 42 proceeds to step S80.

In contrast, when a negative result is obtained in the determination of step S77, the virtual machine management program 42 notifies the management server 3 (FIG. 1) of information indicating that there is no improvement proposal (S78), thereafter ends the improvement proposal presentation processing, and returns to the new virtual machine arrangement destination determination processing of FIG. 16.

Meanwhile, when obtains a negative result is obtained in the determination of step S76, the virtual machine management program 42 determines whether or not a cause of the negative result in step S75 is an insufficient capacity of the node 5 (S79).

When a positive result is obtained in this determination and the node 41 of the arrangement destination is designated in the new virtual machine arrangement destination determination instruction for the selected to-be-created virtual machine VM, the virtual machine management program 42 selects one node 41 from among the nodes 41, and registers the selected node in the additional resource management table 43 (FIG. 15) in order to add the insufficient storage capacity to this node 41 (S80).

Specifically, when there is the row in which the affinity rule ID of the affinity rule designated for the selected to-be-created virtual machine VM is stored in the affinity rule ID field 43A, the node ID of the node 41 selected in S77 is stored in the node ID field 43B among the rows of the additional resource management table 43 and the additional drive capacity field 43C of that row is empty, the virtual machine management program 42 stores the insufficient storage capacity in the additional drive capacity field 43C of this row. When there is the row in which the affinity rule ID of the affinity rule designated for the selected to-be-created virtual machine VM is stored in the affinity rule ID field 43A and the node ID of the node 41 selected in S79 is stored in the node ID field 43B among the rows of the additional resource management table 43 and a value is already stored in the additional drive capacity field 43C of this row, the virtual machine management program 42 updates a value obtained by adding the stored value to the insufficient storage capacity at this time.

Next, the virtual machine management program 42 returns to step S75, and thereafter, sequentially executes processing of step S75 and the subsequent steps as described above.

In contrast, when a negative result is obtained in the determination of step S79, the virtual machine management program 42 reserves an unused row of the additional resource management table 43, stores the affinity rule ID of the affinity rule designated for the selected to-be-created virtual machine VM in the affinity rule ID field 43A of this row, stores the node ID assigned to the node 41 to be newly added at this time in the node ID field 43B of this row, and further updates the value stored in the additional drive capacity field 43C of this row to a value obtained by adding the capacity required in the selected to-be-created virtual machine VM (S81). Thereafter, the virtual machine management program 42 returns to step S75.

Meanwhile, when a positive result is obtained in the determination of step S75, the virtual machine management program 42 regards the selected to-be-created virtual machine VM as being arranged in any node 41 in which it is confirmed that the arrangement can be achieved in step S73 or step S74, and temporarily updates the virtual machine management table 35 (FIG. 6) (S82).

Subsequently, the virtual machine management program 42 determines whether or not the execution of the processing of step S72 and the subsequent steps is ended for all the to-be-created virtual machines VM (S83). When a negative result is obtained in this determination, the virtual machine management program 42 returns to step S70, and thereafter, repeats the processing of step S70 to step S83 while sequentially switching the to-be-created virtual machine VM selected in step S70 to other to-be-created virtual machines VM unprocessed in step S72 and the subsequent steps.

When a positive result is obtained in step S83 by eventually ending the execution of the processing of step S72 to step S82 for all the to-be-created virtual machines VM, the virtual machine management program 42 notifies the management server 3 of the node ID of the new node 41 to be added which is stored in the additional resource management table 43 at this time, the storage capacity to be added to the existing node 41 stored in the additional resource management table 43 at this time, and the node ID of the corresponding node 41, as the improvement proposal (S84). Accordingly, these pieces of information are displayed on the management server 3.

Thereafter, the virtual machine management program 42 ends the improvement proposal calculation processing, and ends the new virtual machine arrangement destination determination processing of FIG. 16.

As described above, in the information processing system 40 according to the present embodiment, when the virtual machine VM to be newly created cannot be arranged in the node 41 that can comply with the affinity rule designated for the corresponding virtual machine VM, satisfies the capacity condition of the corresponding virtual machine VM, and includes the active storage controller 21, since the improvement proposal of the configuration of the cluster 4 is presented, it is possible to obtain an effect of improving usability of the information processing system 40 viewed from the user in addition to the effect obtained by the first embodiment.

(3) Another Embodiment

Although it has been described in the first and second embodiments that the storage management program 32 and the virtual machine management programs 35 and 42 are arranged in the nodes 5 and 41, the present invention is not limited thereto. The storage management program 32 and the virtual machine management programs 35 and 42 may be arranged on the management server 3, and the storage management program 32 and the virtual machine management programs 35 and 42 of the management server 3 may execute the processing described with reference to FIGS. 9 to 13 and FIGS. 16 to 17B. However, even in this case, it is necessary to constantly synchronize the information (information stored in the volume configuration management table 34B (FIG. 5B)) regarding the storage controller 21 of the node configuration management table group 34 in the storage controller group.

Figure 18:
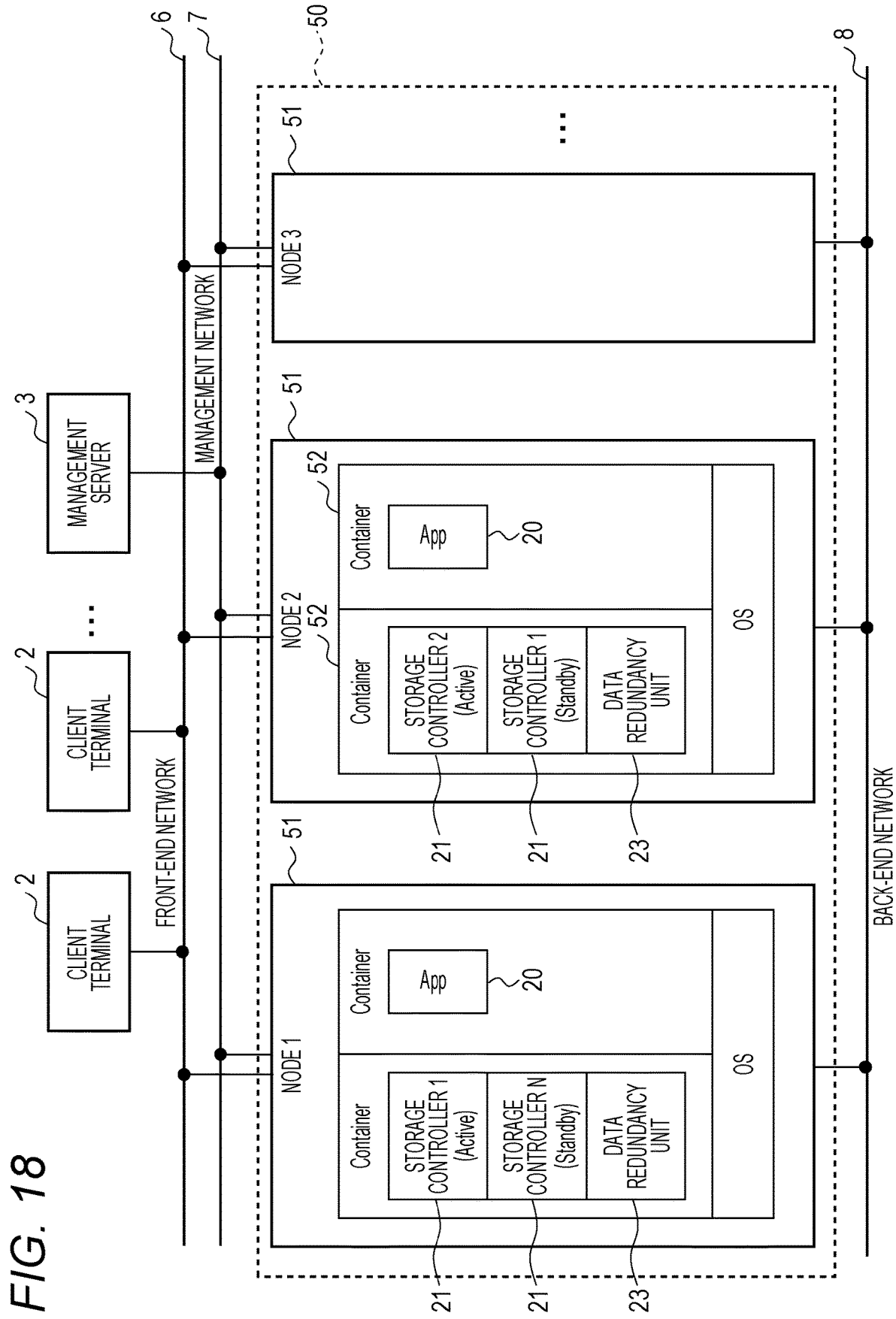
FIG. 18 is a block diagram for describing another embodiment.

Although it has been described in the first and second embodiments that the virtual machine VM operates on the hypervisor 24 as illustrated in FIG. 1, the present invention is not limited thereto. For example, each program required on the container 52 may operate in each node 51 constituting the cluster 50 as illustrated in FIG. 18 in which portions corresponding to those in FIG. 1 are assigned the same reference numerals. In this case, the contents are the same only by replacing all the portions expressed as the "virtual machines" in the first and second embodiments with the "containers", and thus, detailed description thereof will be omitted here. The storage controller 21 and the application 20 may be operated as the programs on the OS instead of the container 52.

Although it has been described in the second embodiment that the function of presenting the improvement proposal of the cluster 4 is applied when the virtual machine is newly arranged, the present invention is not limited thereto, and may be applied when the virtual machine is migrated or when the arrangement of the virtual machines are reviewed.

The present invention can be widely applied to information processing systems having various configurations in which a plurality of nodes constituting a cluster is provided and virtual machines deployed in the nodes have certain restrictions.

What is claimed is:

1. An information processing system comprising:
a plurality of nodes that has a processor; and
a storage device that stores data, wherein
the information processing system operates virtual machines and storage controllers on the processor,
each of the plurality of nodes includes at least two of the storage controllers, and the storage controllers in different nodes make up a storage controller group, in which one of the storage controllers is capable of taking over processing of the storage controllers arranged in different nodes, the one of the storage controllers is a controlling storage controller,
the virtual machines are movable between the different nodes of the plurality of nodes by deploy,
a first storage controller of the storage controllers that is arranged in a same node of the plurality of nodes as a first virtual machine of the virtual machines that processes data input and output, and a second storage controller that is arranged in a different node of the plurality of nodes from the first virtual machine, and the first storage controller and the second storage controller are included in the storage control group,
when a fault occurs in the node in which the first virtual machine and the first storage controller are located,
the second storage controller that belongs to the same group as the first storage controller and operates on the different node takes over the processing of the first storage controller,
the first virtual machine is deployed in the different node in which the second storage controller, which takes over the processing, operates,
wherein regarding each of the virtual machines, a node where one of the virtual machines can be arranged and a node where one of the virtual machines cannot be arranged is defined by a restriction, and a management server arranges the second storage controller in the node where one of the virtual machines can be arranged according to the restriction.

2. The information processing system according to claim 1, wherein
the management server arranges the other virtual machine that cannot be arranged in the same node in the node in which the storage controller included in the storage controller group to which the storage controller used by the one virtual machine belongs is not arranged; and
the management server arranges the storage controller included in the storage controller group to which the storage controller used by the one virtual machine that cannot be arranged in the same node belongs and the storage controller included in the storage controller group to which the storage controller used by the other virtual machine belongs such that the storage controllers are not arranged in the same node.

3. The information processing system according to claim 1, wherein
the management server defines a storage capacity used by the virtual machine and a storage capacity provided by the storage controller, and
the management server selects the storage controller and the node in which the storage controller is to be arranged so as to satisfy the storage capacity used by the virtual machine.

4. The information processing system according to claim 1, wherein
the management server notifies in a case where the restriction is not satisfied.

5. The information processing system according to claim 4, wherein
in the notification, the case where the restriction is not satisfied is distinguished between a case where the restriction is not satisfied in an initial state and a case where the restriction is not satisfied when a fault occurs and the virtual machine moves.

6. The information processing system according to claim 5, wherein a solution to the case where the restriction is not satisfied is included in the notification.

7. The information processing system according to claim 4, wherein a solution for increasing a number of nodes and a solution for increasing a storage capacity of the node are included in the solution.

8. A method implemented in an information processing system comprising a plurality of nodes on a processor, and a storage device that stores data; the method comprising:

the information processing system operating virtual machines and storage controllers on the processor, a storage controller group selectively taking over processing between the storage controllers arranged in different nodes, the virtual machine being movable between the different nodes by deploy, a first storage controller being arranged in the same node as the virtual machine to process input and output data and a second storage controller being arranged in the node different from the virtual machine and are included in the storage controller group; and when a fault occurs in the node in which the virtual machine and the first storage controller that processes the input and output data operate, the second storage controller that belongs to the same group as the same storage controller as the storage controller and operates on the different node takes over the processing, and the virtual machine being deployed in the node in which the storage controller that takes over the processing operates;

wherein for each of the virtual machines, a node where the virtual machine can be arranged and a node where the virtual machine cannot be arranged are defined by a restriction, and a management server arranges the second storage controller in the node where the virtual machine can be arranged according to the restriction.

* * * * *